United States Patent
Aitidis

(10) Patent No.: US 11,919,513 B2
(45) Date of Patent: Mar. 5, 2024

(54) CONTROL SYSTEM, SYSTEM AND METHOD FOR PROVIDING ASSISTANCE TO AN OCCUPANT OF A VEHICLE

(71) Applicant: Jaguar Land Rover Limited, Coventry (GB)

(72) Inventor: Ilias Aitidis, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 182 days.

(21) Appl. No.: 17/422,163

(22) PCT Filed: Jan. 6, 2020

(86) PCT No.: PCT/EP2020/050119
§ 371 (c)(1),
(2) Date: Jul. 9, 2021

(87) PCT Pub. No.: WO2020/144129
PCT Pub. Date: Jul. 16, 2020

(65) Prior Publication Data
US 2022/0111840 A1 Apr. 14, 2022

(30) Foreign Application Priority Data

Jan. 10, 2019 (GB) .................................... 1900332
Jan. 10, 2019 (GB) .................................... 1900333

(51) Int. Cl.
*B60W 30/10* (2006.01)
*G06T 11/00* (2006.01)
*G06V 20/56* (2022.01)

(52) U.S. Cl.
CPC ............. *B60W 30/10* (2013.01); *G06T 11/00* (2013.01); *G06V 20/56* (2022.01); *B60W 2420/42* (2013.01); *B60W 2554/4049* (2020.02)

(58) Field of Classification Search
None
See application file for complete search history.

(56) References Cited

U.S. PATENT DOCUMENTS 8,195,386 B2 * 6/2012 Hu ...................... G08G 1/0969
701/428
10,495,476 B1 * 12/2019 Yu ...................... G01C 21/3647
(Continued)

FOREIGN PATENT DOCUMENTS

DE 102005035412 A1 2/2007
EP 2301812 A1 3/2011
(Continued)

OTHER PUBLICATIONS

Great Britain Intellectual Property Office, Combine Search and Examination Report under Sections 17 and 18(3) Issued in Application No. GB1900332.6, dated Jun. 27, 2019, 5 pages.
(Continued)

*Primary Examiner* — Peter D Nolan
*Assistant Examiner* — Michael F Whalen
(74) *Attorney, Agent, or Firm* — McCoy Russell LLP

(57) ABSTRACT

Aspects of the present invention relate to a control system, a system and a method for providing assistance to an occupant of a vehicle. Specifically, the present invention relates to determining a composite image sequence comprising a sequence of image frames, each comprising a captured image of an environment external to the vehicle and a trajectory indicator indicative of the determined vehicle trajectory through that environment. The trajectory indicator is positioned within the composite image sequence in dependence on movement by the vehicle between the time at which images associated with the corresponding image frames are captured such that the trajectory indicator appears substantially stationary in a direction of travel of the vehicle (Continued)

with respect to one or more image objects within the composite image sequence.

11 Claims, 16 Drawing Sheets

(56) References Cited

U.S. PATENT DOCUMENTS

| | | | |
|---|---|---|---|
| 11,486,726 B2* | 11/2022 | Kleen | B60K 35/00 |
| 2008/0195315 A1 | 8/2008 | Hu et al. | |
| 2010/0164702 A1 | 7/2010 | Sasaki et al. | |
| 2011/0301813 A1* | 12/2011 | Sun | B62D 15/029 |
| | | | 348/148 |
| 2012/0226437 A1* | 9/2012 | Li | G01C 21/3647 |
| | | | 701/423 |
| 2013/0325205 A1* | 12/2013 | Oba | B62D 15/0295 |
| | | | 701/1 |
| 2017/0154554 A1 | 6/2017 | Tanaka et al. | |
| 2017/0329143 A1 | 11/2017 | Svarichevsky et al. | |
| 2018/0244153 A1 | 8/2018 | Ejiri | |
| 2019/0248287 A1* | 8/2019 | Ono | G09G 5/003 |
| 2020/0031283 A1* | 1/2020 | Nakasho | B60R 11/02 |
| 2020/0149916 A1* | 5/2020 | Yu | G01C 21/3415 |
| 2021/0323410 A1* | 10/2021 | Huber | G02B 5/30 |

FOREIGN PATENT DOCUMENTS

| | | |
|---|---|---|
| EP | 3667641 A1 | 6/2020 |
| WO | 2018207566 A1 | 11/2018 |
| WO | WO-2019034916 A1 * | 2/2019 |

OTHER PUBLICATIONS

ISA European Patent Office, International Search Report and Written Opinion Issued in Application No. PCT/EP2020/050119, dated Feb. 21, 2020, WIPO, 10 pages.

Great Britain Intellectual Property Office, Examination Report under Section 18(3) Issued in Application No. GB1900332.6, dated Mar. 5, 2021, 3 pages.

* cited by examiner

CONTROL SYSTEM, SYSTEM AND METHOD FOR PROVIDING ASSISTANCE TO AN OCCUPANT OF A VEHICLE

CROSS REFERENCE TO RELATED APPLICATIONS

The present application is a U.S. National Phase of International Application No. PCT/EP2020/050119 entitled "A CONTROL SYSTEM, SYSTEM AND METHOD FOR PROVIDING ASSISTANCE TO AN OCCUPANT OF A VEHICLE," and filed on Jan. 6, 2020. International Application No. PCT/EP2020/050119 claims priority to Great Britain Patent Application No. 1900332.6 filed on Jan. 10, 2019 and Great Britain Patent Application No. 1900333.4 filed on Jan. 10, 2019. The entire contents of each of the above-listed applications are hereby incorporated by reference for all purposes.

TECHNICAL FIELD

The present disclosure relates to a control system, a system and a method for providing assistance to an occupant of a vehicle. Aspects of the invention relate to a control system, to a system, to a vehicle, to a method, to a non-transitory computer readable medium, and to computer software for providing assistance whilst performing manoeuvres within a vehicle.

BACKGROUND AND SUMMARY

It is known to provide driver assistance systems which provide a visual representation of an environment external to a vehicle. Some of these systems include an image sequence of the environment captured from one or more cameras mounted on or within the vehicle. In addition, some systems include some form of indication of a predicted path of the vehicle through the image sequence. This generally takes the form of one or more trajectory lines. Conventionally, trajectory lines may illustrate the predicted path of one or more wheels of the vehicle within the environment.

A disadvantage of prior art systems is that the trajectory lines themselves appear fixed with respect to the vehicle in the direction of travel of the vehicle. This can appear unnatural and/or confusing to a user as the trajectory lines may appear to "float" over a surface as the vehicle moves within the environment, particularly where the terrain over which the vehicle is travelling is not flat with respect to the vehicle. This can make it difficult to assess any correspondence between the location of the trajectory lines within the image sequence and any objects within the environment external to the vehicle present in the image sequence.

It is an aim of the present invention to address one or more of the disadvantages associated with the prior art.

Aspects and embodiments of the invention provide a control system, a system, a vehicle, a method, a non-transitory computer readable medium and computer software as claimed in the appended claims.

According to an aspect of the present invention there is provided a control system for providing assistance to an occupant of a vehicle, the control system comprising one or more controllers, configured to:
a. determine a vehicle trajectory from one or more vehicle parameters; and
b. determine a composite image sequence comprising a sequence of image frames, each image frame comprising a captured image and a trajectory indicator indicative of the determined vehicle trajectory;
c. wherein the control system is configured to position the trajectory indicator within the composite image sequence in dependence on a distance travelled by the vehicle such that the trajectory indicator appears substantially stationary in a direction of travel of the vehicle with respect to one or more image objects within the composite image sequence, the one or more image objects being external to the vehicle.

According to an aspect of the present invention there is provided a control system for providing assistance to an occupant of a vehicle, the control system comprising one or more controllers, configured to:
receive one or more vehicle parameters;
receive image data from an imaging device comprising captured images of an environment external to the vehicle;
determine a vehicle trajectory in dependence on the or each parameter;
determine a composite image sequence comprising a sequence of image frames, each image frame comprising a captured image and a trajectory indicator indicative of the determined vehicle trajectory; and
output a signal indicative of the composite image sequence to a display for displaying the composite image sequence to the occupant of the vehicle;
wherein the control system is configured to move the trajectory indicator from a first position in a first image frame of the composite image sequence, to a second position in a second image frame of the composite image sequence in dependence on a distance travelled by the vehicle between the time at which an image associated with the first image frame is captured and the time at which an image associated with the second image frame is captured such that the trajectory indicator appears substantially stationary in a direction of travel of the vehicle with respect to one or more image objects within the composite image sequence, the one or more image objects being external to the vehicle.

Advantageously, the vehicle may be made to appear to a user of the control system viewing the composite image to travel over a stationary trajectory indicator. This provides the user with a more natural and less confusing representation of the vehicle's movement through the environment. The control system of the present invention provides a visual representation of an environment of a vehicle which enables a user to better assess any correspondence between the location of a trajectory indicator, and hence a future position of a vehicle, with respect to one or more objects within the environment external to the vehicle.

In embodiments, the one or more controllers collectively comprise: at least one electronic processor having an electrical input for receiving the one or more vehicle parameters and/or the image data; and at least one electronic memory device operatively coupled to the at least one electronic processor and having instructions stored therein; wherein the at least one electronic processor is configured to access the at least one memory device and execute the instructions stored therein so as to determine the composite image sequence. Optionally, the at least one electronic memory device is electrically coupled to the at least one electronic processor.

In embodiments, the first position and the second position are separated within the composite image sequence by a distance directly proportional to the distance travelled by the vehicle between the time at which the image associated with the first image frame is captured and the time at which the image associated with the second image frame is captured.

The trajectory indicator may comprise a plurality of indicator sections. In some embodiments the control system is configured to move each of the indicator sections from respective first positions within the first image frame of the composite image sequence, to respective second positions within the second image frame of the composite image sequence in dependence on a distance travelled by the vehicle between the time at which an image associated with the first image frame is captured and the time at which an image associated with the second image frame is captured such each indicator section appears substantially stationary in the direction of travel of the vehicle within the composite image sequence with respect to the one or more image objects.

Advantageously using a plurality of trajectory sections as opposed to a solid trajectory line provides a better representation of movement of the trajectory indicator with respect to the vehicle.

In some embodiments the trajectory indicator comprises one or more lines indicative of a predicted path to be traversed by one or more wheels of the vehicle. In such embodiments, the trajectory indicator may comprise a first trajectory line representative of a predicted path to be traversed by a first wheel of the vehicle and a second trajectory line representative of a predicted path to be traversed by a second wheel of the vehicle. Advantageously, an occupant of the vehicle may be provided with information relating to the predicted path of one or more wheels of the vehicle through the environment represented by the composite image sequence. This may assist the occupant by providing information relating to the terrain or other image objects which may be encountered by the wheels of the vehicle were the vehicle to continue travelling along the predicted path.

In some embodiments the one or more image objects comprise a traversable surface within the composite image sequence. In such embodiments, the control system may be configured to move the trajectory indicator from the first position to the second position such that, to the user, the vehicle appears to move over the trajectory indicator as the vehicle traverses the surface along the determined vehicle trajectory. Advantageously, the control system may provide a trajectory indicator which is fixed in position with respect to the surface over which the vehicle is travelling. In this way, the occupant may be able to better assess the path of the vehicle over the surface.

In some embodiments the control system may be configured to analyse the received image data to determine a topography of the surface. In such embodiments, the control system may be configured to determine a position and/or orientation of the trajectory indicator within one or more image frames of the composite image sequence in dependence on the determined topography. In some embodiments the control system may be configured to: receive sensor data from one or more sensors indicative of a topography of the surface; and determine the composite image sequence in dependence on the received sensor data.

The control system may comprise an electrical input for receiving the sensor data from the one or more sensors.

In embodiments, the control system may be configured to process the received sensor data to determine a surface profile of the surface; and determine a position and/or orientation of the trajectory indicator within one or more image frames of the composite image sequence in dependence on the determined surface profile such that the trajectory indicator appears to lie on the surface within the composite image sequence.

In embodiments, the control system may be configured to: process the received image data to determine a speed and/or direction of motion of the one or more image objects within the composite image sequence; and move the trajectory indicator from the first position to the second position in dependence on the determined speed and/or direction of motion of the one or more image objects within the composite image sequence. By moving the trajectory indicator in dependence on the speed and/or direction of motion of the one or more image objects, the trajectory indicator may be made to appear to be in a fixed position with respect to the one or more image objects.

The one or more vehicle parameters may comprise a steering angle of the vehicle. The steering angle may comprise an angle of a steering wheel of the vehicle or the angle of one or more steerable wheels of the vehicle.

A control system as claimed in any preceding claim, wherein the one or more vehicle parameters comprise a velocity of the vehicle. In such embodiments, the control system may be configured to move the trajectory indicator within the composite image sequence at a speed and in a direction proportional to the velocity of the vehicle.

In some embodiments the control system may be configured to receive image data from a plurality of imaging devices. In such embodiments, the control system may be configured to process the image data received from the plurality of imaging devices to determine the composite image sequence. The control system may be configured to process the received image data by applying one or more image transformations and/or stitching image data from two or more different imaging devices together to form the composite image sequence, as will be known in the art. The first and second image frames of the composite image sequence may each comprise image data from two or more separate imaging devices.

According to a further aspect of the invention there is provided a system comprising the control system of any preceding aspect of the invention and an imaging device configured to capture one or more images of an environment external to the vehicle.

In embodiments, the system may comprise a display. The display may be a vehicle display configured to receive a signal indicative of the composite image sequence for displaying the composite image sequence to an occupant of the vehicle.

According to another aspect of the present invention there is provided a vehicle comprising a control system or a system according to any preceding aspect of the invention.

According to an aspect of the invention there is provided a method for providing assistance to an occupant of a vehicle, the method comprising:

determining a vehicle trajectory from one or more vehicle parameters; and determining a composite image sequence comprising a sequence of image frames, each image frame comprising a captured image and a trajectory indicator indicative of the determined vehicle trajectory;

wherein the method comprises positioning the trajectory indicator within the composite image sequence in dependence on a distance travelled by the vehicle such that the trajectory indicator appears substantially stationary in a direction of travel of the vehicle with respect to one or more image objects within the composite image sequence, the one or more image objects being external to the vehicle.

According to an aspect of the invention there is provided a method for providing assistance to an occupant of a vehicle, the method comprising:

receiving one or more vehicle parameters;

receiving image data comprising captured images of an environment external to the vehicle;

determining a vehicle trajectory in dependence on the or each parameter;

determining a composite image sequence comprising a sequence of image frames, each image frame comprising a captured image and a trajectory indicator indicative of the determined vehicle trajectory; and outputting a signal indicative of the composite image sequence to a display for displaying the composite image sequence to the occupant of the vehicle;

wherein the method comprises moving the trajectory indicator from a first position in a first image frame of the composite image sequence, to a second position in a second image frame of the composite image sequence in dependence on a distance travelled by the vehicle between the time at which an image associated with the first image frame is captured and a time at which an image associated with the second image frame is captured such that, to the user, the trajectory indicator appears substantially stationary in a direction of travel of the vehicle with respect to one or more image objects within the composite image sequence, the one or more image objects being external to the vehicle.

In embodiments, the first position and the second position are separated within the composite image sequence by a distance directly proportional to the distance travelled by the vehicle between the time at which the image associated with the first image frame is captured and the time at which the image associated with the second image frame is captured.

Advantageously, the vehicle may be made to appear to a user of the control system viewing the composite image to travel over a stationary trajectory indicator. This provides the user with a more natural and less confusing representation of the vehicle's movement through the environment when compared with prior art systems. The method of the present invention provides a visual representation of an environment of a vehicle which enables a user to better assess any correspondence between the location of a trajectory indicator, and hence a future position of a vehicle, with respect to one or more objects within the environment external to the vehicle.

The trajectory indicator may comprise a plurality of indicator sections. In some embodiments the method may comprise moving each of the indicator sections from respective first positions within the first image frame of the composite image sequence, to respective second positions within the second image frame of the composite image sequence in dependence on a distance travelled by the vehicle between the time at which an image associated with the first image frame is captured and the time at which an image associated with the second image frame is captured such each indicator section appears substantially stationary in the direction of travel of the vehicle within the composite image sequence with respect to the one or more image objects.

In some embodiments the trajectory indicator comprises one or more lines indicative of a predicted path to be traversed by one or more wheels of the vehicle. In such embodiments, the trajectory indicator may comprise a first trajectory line representative of a predicted path to be traversed by a first wheel of the vehicle and a second trajectory line representative of a predicted path to be traversed by a second wheel of the vehicle. Advantageously, an occupant of the vehicle may be provided with information relating to the predicted path of one or more wheels of the vehicle through the environment represented by the composite image sequence. This may assist the occupant by providing information relating to the terrain or other image objects which may be encountered by the wheels of the vehicle were the vehicle to continue travelling along the predicted path.

In some embodiments the one or more image objects comprise a traversable surface within the composite image sequence. In such embodiments, the method may comprise moving the trajectory indicator from the first position to the second position such that, to the user, the vehicle appears to move over the trajectory indicator as the vehicle traverses the surface along the determined vehicle trajectory. Advantageously, the method may provide a trajectory indicator which is fixed in position with respect to the surface over which the vehicle is travelling. In this way, the occupant may be able to better assess the path of the vehicle over the surface.

In some embodiments the method may comprise analysing the received image data to determine a topography of the surface. The method may comprise determining a position and/or orientation of the trajectory indicator within one or more image frames of the composite image sequence in dependence on the determined topography. In some embodiments the method may comprise receiving sensor data from one or more sensors indicative of a topography of the surface; and determining the composite image sequence in dependence on the received sensor data. In some embodiments the method comprises processing the received sensor data to determine a surface profile of the surface; and determining a position and/or orientation of the trajectory indicator within one or more image frames of the composite image sequence in dependence on the determined surface profile such that the trajectory indicator appears to lie on the surface within the composite image sequence.

In embodiments, the method may comprise processing the received image data to determine a speed and/or direction of motion of the one or more image objects within the composite image sequence; and moving the trajectory indicator from the first position to the second position in dependence on the determined speed and/or direction of motion of the one or more image objects within the composite image sequence. By moving the trajectory indicator in dependence on the speed and/or direction of motion of the one or more image objects, the trajectory indicator may be made to appear to be in a fixed position with respect to the one or more image objects.

The one or more vehicle parameters may comprise a steering angle of the vehicle. The steering angle may comprise an angle of a steering wheel of the vehicle or the angle of one or more steerable wheels of the vehicle.

In some embodiments the method may comprise receiving image data from a plurality of imaging devices. In such embodiments, the method may comprise processing the image data received from the plurality of imaging devices to determine the composite image sequence. The processing may comprise processing the received image data by applying one or more image transformations and/or stitching image data from two or more different imaging devices together to form the composite image sequence, as will be known in the art. The first and second image frames of the composite image sequence may each comprise image data from two or more separate imaging devices.

According to an aspect of the invention there is provided a computer readable medium having instructions stored therein which, when executed by one or more electronic processors, cause the one or more electronic processors to perform the method of a preceding aspect of the invention. Optionally, the computer readable medium comprises a non-transitory computer readable medium.

According to a further aspect of the invention there is provided computer software which, when executed by one or more processors, causes performance of the method of a preceding aspect of the invention.

According to a further aspect of the invention there is provided a control system for providing assistance to an occupant of a vehicle, the control system comprising one or more controllers configured to: determine a composite image sequence comprising one or more image frames, the or each image frame comprising a captured image of an environment external to the vehicle and a trajectory indicator indicative of a determined vehicle trajectory through the environment; and output a signal indicative of the composite image sequence to a display for displaying the composite image sequence to the occupant of the vehicle; wherein the control system is configured to position the trajectory indicator at one or more locations within the or each image frame in dependence on a topography of the surface.

According to a further aspect of the invention there is provided a control system for providing assistance to an occupant of a vehicle, the control system comprising one or more controllers, configured to:
  receive one or more vehicle parameters;
  receive image data from an imaging device comprising captured images of an environment external to the vehicle;
  receive or determine topography data indicative of a topography of a surface within the environment;
  determine a vehicle trajectory in dependence on the or each parameter;
  determine a composite image sequence comprising one or more image frames, the or each image frame comprising one of said captured images and a trajectory indicator indicative of the determined vehicle trajectory; and
  output a signal indicative of the composite image sequence to a display for displaying the composite image sequence to the occupant of the vehicle;
  wherein the control system is configured to position the trajectory indicator at one or more locations within the or each image frame in dependence on the received topography data.

Advantageously, the trajectory indicator may be made to appear "anchored" to, or aligned with, the ground within the composite image sequence. This increases an occupant's situational awareness of the driving environment, providing the user with a more natural and less confusing representation of the vehicle's movement through the environment when compared with prior art systems. The control system of the present invention provides a visual representation of an environment of a vehicle which enables a user to better assess any correspondence between the location of a trajectory indicator, and hence a future position of a vehicle, with respect to one or more objects within the environment external to the vehicle, particularly in environments where the topography of the terrain over which the vehicle is travelling is not substantially flat, but includes inclines, declines and other variations.

In embodiments, the one or more controllers collectively comprise: at least one electronic processor having an electrical input for receiving the one or more vehicle parameters and/or the image data; and at least one electronic memory device operatively coupled to the at least one electronic processor and having instructions stored therein; wherein the at least one electronic processor is configured to access the at least one memory device and execute the instructions stored therein so as to determine the composite image sequence.

The control system may be configured to position the trajectory indicator within the or each image frame such that an apparent orientation of the trajectory indicator at the or each image frame location is substantially equivalent to the orientation of the surface at the image frame location. Optionally, the control system is configured to position the trajectory indicator within the or each image frame such that the trajectory indicator is indicative of the determined trajectory of the vehicle over the surface.

In some embodiments the topography data comprises a surface profile of the surface. In such embodiments the control system may be configured to: correlate the surface profile with the surface within the or each image frame; and position the trajectory indicator in accordance with an orientation of the surface profile at the one or more image frame locations. Alternatively, the topography data comprises a point cloud comprising a plurality of data points indicative of the topography of the surface within the environment. In such embodiments the control system may be configured to: correlate the point cloud with the surface within the or each image frame; and position the trajectory indicator in accordance with the point cloud at the one or more image frame locations. Correlating the surface profile or point cloud with the surface in the or each image frame may comprise overlaying the surface profile or point cloud onto a representation of the surface in the or each image frame in order to align the topography data with the representation of the surface.

In embodiments, the topography data comprises sensor data from one or more sensors associated with the vehicle. In such embodiments the control system may be configured to: determine a topography of the surface within the environment in dependence on the sensor data; and position the trajectory indicator within the or each image frame in dependence on the determined topography. Advantageously, the control system of the present invention may be utilised to determine a topography of a surface from raw sensor data.

In embodiments, the control system may be configured to: determine the topography data from the sensor data. Advantageously, the control system of the present invention may be utilised to determine the topography data from raw sensor data. For example, in some embodiments the sensor data may comprise image data and the control system may be configured to extract the topography data from the image data.

The control system may be configured to: determine a topography of the surface within the environment by determining a surface profile of the surface in dependence on the sensor data; correlate the surface profile with the surface within the or each image frame; and position the trajectory indicator in accordance with an orientation of the surface profile at the one or more image frame locations. Alternatively, the control system may be configured to: determine a topography of the surface within the environment by determining a point cloud comprising a plurality of data points indicative of the topography of the surface in dependence on the sensor data; correlate the point cloud with the surface within the or each image frame; and position the trajectory indicator in accordance with the point cloud at the one or more image frame locations. As described herein, correlating the surface profile or point cloud with the surface in the or each image frame may comprise overlaying the surface profile or point cloud onto a representation of the surface in the or each image frame in order to align the topography data with the representation of the surface.

The one or more sensors may comprise one or more cameras. The camera(s) may comprise a mono camera, stereo camera, optical, and/or infrared camera, for example. Additionally or alternatively, the one or more sensors may comprise a RADAR sensor, a LIDAR sensor, and/or an ultrasonic sensor. In embodiments the one or more sensors may comprise a position sensor, which may be a GNSS sensor for determining an absolute position of an associated object, e.g. the vehicle. The one or more sensors may comprise one or more attitude sensors for determining an orientation of the vehicle with respect to the environment. The attitude sensor(s) may comprise an inertial measurement unit (IMU), accelerometer, inclinometer, and/or a gyroscope, for example.

The one or more vehicle parameters may comprise a steering angle of the vehicle. The steering angle may comprise an angle of a steering wheel of the vehicle, or an angle of one or more steerable wheels of the vehicle. The one or more vehicle parameters may comprise a velocity of the vehicle; and/or an orientation of the vehicle about one or more axes.

In embodiments, the control system may be configured to: receive or determine vehicle orientation data indicative of an orientation of the vehicle about one or more axes; determine a relative orientation of the vehicle with respect to the surface in dependence on the vehicle orientation data; and position the trajectory indicator at the one or more image frame locations in dependence on the relative orientation of the vehicle. In this way, the orientation of the vehicle within the environment may be utilised to determine a required position for a trajectory indicator within the composite image sequence.

In some embodiments the trajectory indicator may comprise a plurality of indicator sections. In such embodiments, the control system may be configured to position each trajectory indicator section at a respective image frame location in dependence on the topography of the surface at the respective image frame location. In some embodiments each indicator section is moveable about a respective pivot point associated with an end point of a preceding indicator section. In such embodiments, the control system may be configured to move one or more of the plurality of indicator sections about its respective pivot point in dependence on the topography of the surface at a corresponding image frame location. In this way, a trajectory indicator may be constructed from a plurality of indicator sections which avoids any discontinuities along the length of the trajectory indicator which may otherwise be encountered if indicator sections were moved without taking into account the position of adjacent sections.

According to a further aspect of the invention there is provided a system for providing assistance to an occupant of a vehicle comprising a control system of any preceding aspect of the invention, and one or more selected from: an imaging device configured to capture one or more images of an environment external to the vehicle; and a display configured to display the composite image sequence to the occupant of the vehicle.

According to another aspect of the invention there is provided a vehicle comprising a control system or a system of any aspect of the invention described herein.

According to yet a further aspect of the invention there is provided a method for providing assistance to an occupant of a vehicle, the method comprising:

receiving one or more vehicle parameters;
    receiving image data from an imaging device comprising captured images of an environment external to the vehicle;
    receiving or determining topography data indicative of a topography of a surface within the environment;
    determining a vehicle trajectory in dependence on the or each parameter;
    determining a composite image sequence comprising a one or more image frames, the or each image frame comprising one of said captured images and a trajectory indicator indicative of the determined vehicle trajectory; and
    outputting a signal indicative of the composite image sequence to a display for displaying the composite image sequence to the occupant of the vehicle;
    wherein the method comprises positioning the trajectory indicator at one or more locations within the or each image frame in dependence on the topography data.

In some embodiments the method comprises positioning the trajectory indicator within the or each image frame such that an apparent orientation of the trajectory indicator at the or each image frame location is substantially equivalent to the orientation of the surface at the image frame location. Optionally, the method comprises positioning the trajectory indicator within the or each image frame such that the trajectory indicator is indicative of the determined trajectory of the vehicle over the surface.

In embodiments, the topography data comprises sensor data from one or more sensors, and the method comprises: determining a topography of the surface in dependence on the sensor data; and positioning the trajectory indicator within the or each image frame in dependence on the determined topography.

In embodiments, the method may comprise determining the topography data from the sensor data. For example, in some embodiments the sensor data may comprise image data and the method may comprise extracting the topography data from the image data.

In some embodiments the topography data comprises a surface profile of the surface. In such embodiments the method comprises correlating the surface profile with the surface within the or each image frame; and positioning the trajectory indicator in accordance with an orientation of the surface profile at the one or more image frame locations. Alternatively, the topography data comprises a point cloud comprising a plurality of data points indicative of the topography of the surface within the environment. In such embodiments the method may comprise correlating the point cloud with the surface within the or each image frame; and positioning the trajectory indicator in accordance with the point cloud at the one or more image frame locations. Correlating the surface profile or point cloud with the surface in the or each image frame may comprise overlaying the surface profile or point cloud onto a representation of the surface in the or each image frame in order to align the topography data with the representation of the surface.

In embodiments, the topography data comprises sensor data from one or more sensors associated with the vehicle. In such embodiments the method may comprise determining a topography of the surface within the environment in dependence on the sensor data; and positioning the trajectory indicator within the or each image frame in dependence on the determined topography.

In some embodiments the method comprises determining a topography of the surface within the environment by determining a surface profile of the surface in dependence on the sensor data; correlating the surface profile with the surface within the or each image frame; and positioning the trajectory indicator in accordance with an orientation of the surface profile at the one or more image frame locations. Alternatively, the method may comprise determining a topography of the surface within the environment by determining a point cloud comprising a plurality of data points indicative of the topography of the surface in dependence on the sensor data; correlating the point cloud with the surface within the or each image frame; and positioning the trajectory indicator in accordance with the point cloud at the one or more image frame locations. As described herein, correlating the surface profile or point cloud with the surface in the or each image frame may comprise overlaying the surface profile or point cloud onto a representation of the surface in the or each image frame in order to align the topography data with the representation of the surface.

The method may comprise receiving or determining vehicle orientation data indicative of an orientation of the vehicle about one or more axes; determining a relative orientation of the vehicle with respect to the surface in dependence on the vehicle orientation data; and positioning the trajectory indicator at the one or more image frame locations in dependence on the relative orientation of the vehicle.

In some embodiments the trajectory indicator may comprise a plurality of indicator sections. In such embodiments, the method may comprise positioning each trajectory indicator section at a respective image frame location in dependence on the topography of the surface at the respective image frame location. In some embodiments each indicator section is moveable about a respective pivot point associated with an end point of a preceding indicator section. In such embodiments, the method may comprise moving one or more of the plurality of indicator sections about its respective pivot point in dependence on the topography of the surface at a corresponding image frame location.

According to another aspect of the invention there is provided a non-transitory computer readable medium having instructions stored therein which, when executed by a computing means, perform a method according to the preceding aspect of the invention.

According to a further aspect of the invention there is provided computer software which, when executed by one or more processors, causes performance of a method in accordance with any preceding aspect of the invention.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which.

DETAILED DESCRIPTION

A control system 10, system 30, vehicle 50 and method 100 in accordance with embodiments of the present invention are described herein with reference to the accompanying Figures.

Figure 1:
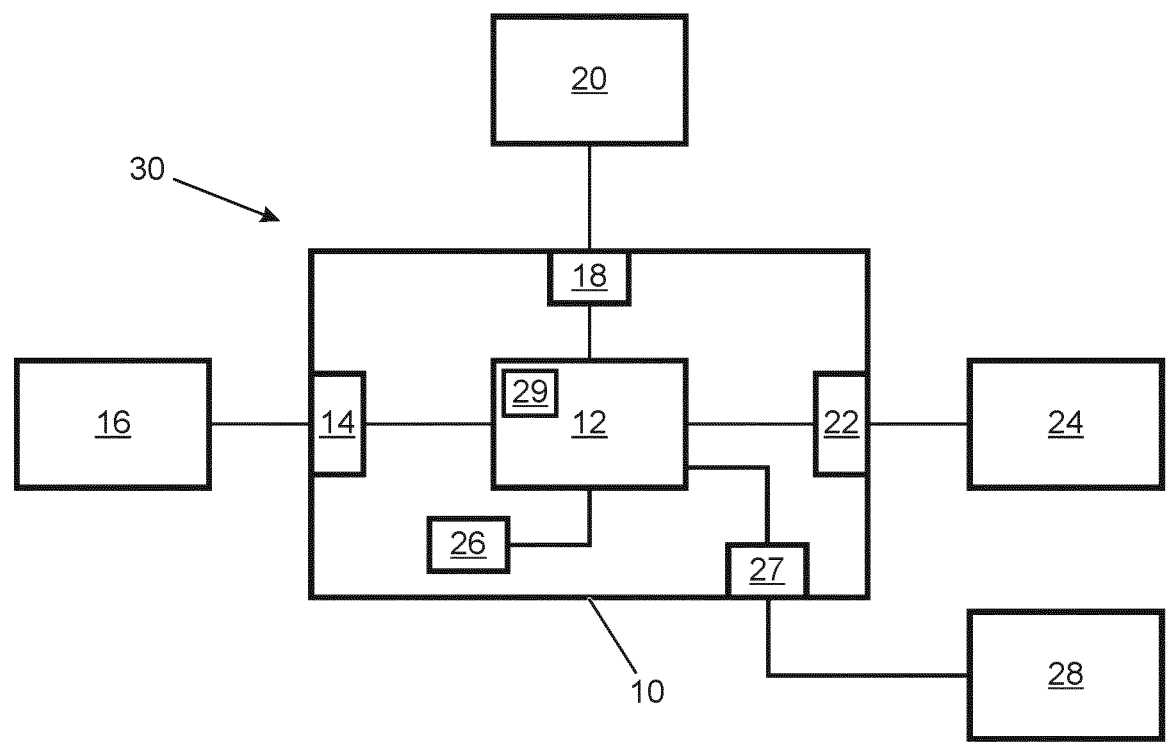
FIG. 1 shows a schematic representation of an embodiment of a control system in accordance with the present invention.

With reference to FIG. 1, a system 30 in accordance with the invention comprises a control system 10. The control system 10 is operatively coupled to a vehicle system 16, an imaging device in the form of a camera 20, one or more sensors 28 and a display 24 as shown in FIG. 1. The control system 10 includes a processor 12, memory device 26, electrical inputs 14, 18, 27, and an electrical output 22.

The camera 20 is configured to capture images of an environment external to the vehicle. As will be described herein, the control system 10 is configured to receive image data representative of the images captured by the camera 20, and use this data to determine a composite image sequence.

The vehicle system 16 may be any system capable of outputting a signal indicative of one or more vehicle parameters, specifically relating to the motion of the vehicle. The vehicle system 16 may comprise a steering system of the vehicle which may be capable of outputting a signal indicative of a steering angle of the vehicle. The steering angle may be an angular position of a steering wheel of the vehicle. Additionally or alternatively, the steering angle may comprise an angular position of one or more steerable wheels of the vehicle. The steering angle may relate to a predicted radius of curvature of a vehicle path due to the angular position of one or more steerable wheels of the vehicle. The vehicle system 16 may comprise a braking system of the vehicle, such as an anti-lock braking system (ABS) which may be configured to output a signal indicative of a wheel speed of the vehicle, and hence a speed of the vehicle. The vehicle system 16 may comprise a power unit management system which may be configured to output a signal indicative of an engine and/or motor speed of the vehicle, for example. In use, the control system 10 may be configured to determine the vehicle trajectory in dependence on any one or more such types of vehicle parameter.

In embodiments, the vehicle system 16 is an imaging system, and may comprise the camera 20, for example. In such embodiments, the vehicle system 16 comprises an image processing unit configured to analyse movement of one or more objects within image data captured by the imaging system. Such analysis may be used to infer a speed of the vehicle relative to those objects, and hence a speed of the vehicle within the environment.

The one or more sensors 28 may comprise sensors capable of detecting obstacles, surfaces and other such objects within the environment of the vehicle, and/or information relating to the position/orientation of the vehicle within that environment. For example, the one or more sensors may comprise an imaging device such as a camera, RADAR, LIDAR, ultrasonic sensors, etc. The one or more sensors may comprise the camera 20 configured to capture images of the environment external to the vehicle. The data received from the one or more sensors 28 may be used to map the environment external to the vehicle. For example, in embodiments the control system 10 is configured to utilise data received from the sensor(s) to determine a topography of a surface over which the vehicle is currently travelling or will travel were it to continue along the determined trajectory. This topography may be used to determine the composite image sequence as described herein. The sensor(s) 28 may additionally include an inertial measurement unit (IMU) for determining an orientation of the vehicle along one or more axes, and/or sensors relating to a GNSS module (e.g. a GPS module) within the vehicle suitable for determining a position of the vehicle within a mapped environment.

In use, the control system 10 receives, at electrical input 14, one or more vehicle parameters from the vehicle system 16. The one or more vehicle parameters may comprise a speed of the vehicle, velocity of the vehicle, steering angle, and/or orientation of the vehicle (e.g. roll, pitch and/or yaw angle), for example. The control system 10 is further configured to receive image data, at electrical input 18, from the camera 20. The image data comprises captured images of an environment external to the vehicle. The processor 12 determines a vehicle trajectory using the received vehicle parameters, and uses the determined vehicle trajectory along with the received image data to determine a composite image sequence. Specifically, the processor 12 is configured to form a composite image sequence comprising a sequence of image frames, each comprising a captured image and a trajectory indicator indicative of the determined vehicle trajectory. A control signal indicative of the composite image sequence is output via electrical output 22 to the display 24 for displaying the composite image sequence to an occupant of the vehicle.

As will be described in further detail herein, in generating the composite image sequence the control system 10 is configured to move the trajectory indicator within the composite image sequence such that the trajectory indicator appears substantially stationary in a direction of travel of the vehicle. Specifically, the control system 10 is configured to move the trajectory indicator within the composite image sequence such that the trajectory indicator appears substantially stationary with respect to one or more image objects within the composite image sequence, the image object(s) being external to the vehicle. In some embodiments the control system 10 is configured to receive, at electrical input 27, sensor data from the sensor(s) 28. The sensor data may be indicative of a topography of a surface over which the vehicle may travel.

In embodiments, in generating the composite image sequence the control system 10 is configured to determine a position and/or orientation of the trajectory indicator image frames of the composite image sequence in dependence on a topography of a surface over which the vehicle is predicted to travel. Sensor data from the sensor(s) 28 is used to determine a topography of a traversable surface within the environment of the vehicle. This is achieved by mapping, e.g. using a point cloud map, contour map, sparse map, etc. an environment using one or more sensor(s). The mapping of the environment is used to determine a three dimensional representation of the environment, and specifically a traversable surface within the environment of the vehicle. Overlaying or otherwise aligning this three dimensional representation with the images obtained by camera 20, and positioning/orientating the trajectory indicator with respect to the three dimensional representation, ensures that, to a user, the trajectory indicator(s) lie on the surface (and are fixed with respect thereto). For example, in determining the composite image sequence, the control system 10 may be configured to position and/or orientate the trajectory indicator such that it aligns to the orientation of the surface at the desired position of the trajectory indicator within an image frame(s) of the composite image sequence. In this way, the trajectory indicator appears, to a user of the system, to lie on top of a traversable surface within the environment.

As will be appreciated, any process step (or method step) described herein may be performed by running computer software, e.g. computer software 29, on one or more processors 12 as shown in FIG. 1. Any such software 29 may be stored in in a location accessible by the processor 12, e.g. at memory 26.

Figure 2:
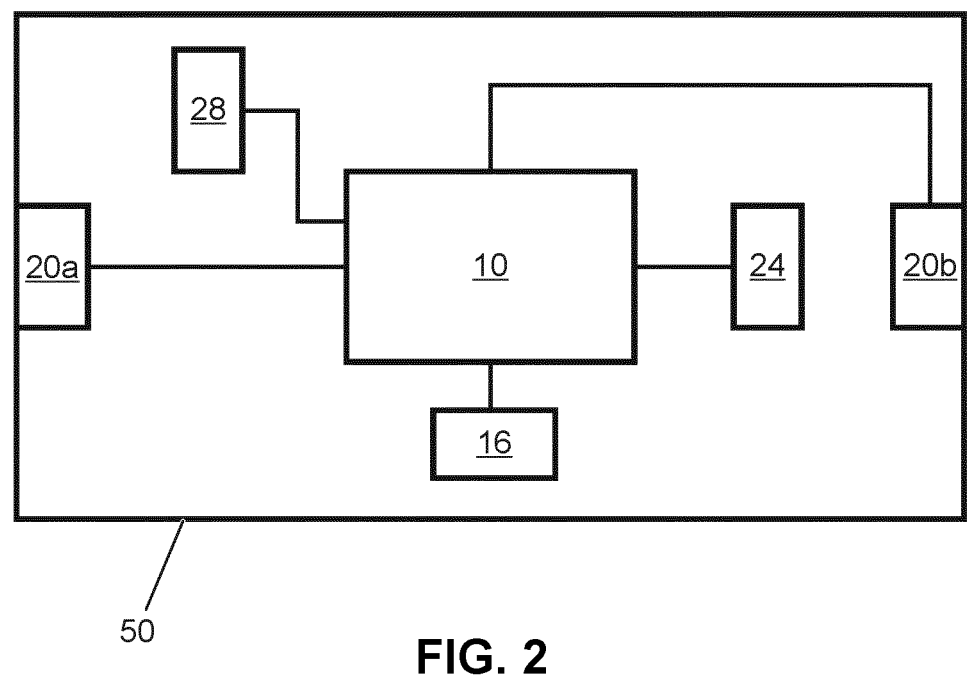
FIG. 2 shows a schematic representation of an embodiment of a vehicle in accordance with the present invention.

FIG. 2 illustrates an embodiment of a vehicle 50 in accordance with an embodiment of the invention. As shown, the vehicle 50 comprises a system 30 which includes control system 10, imaging devices in the form of cameras 20a, 20b, the vehicle system 16, sensor 28 and the display 24.

Figure 3:
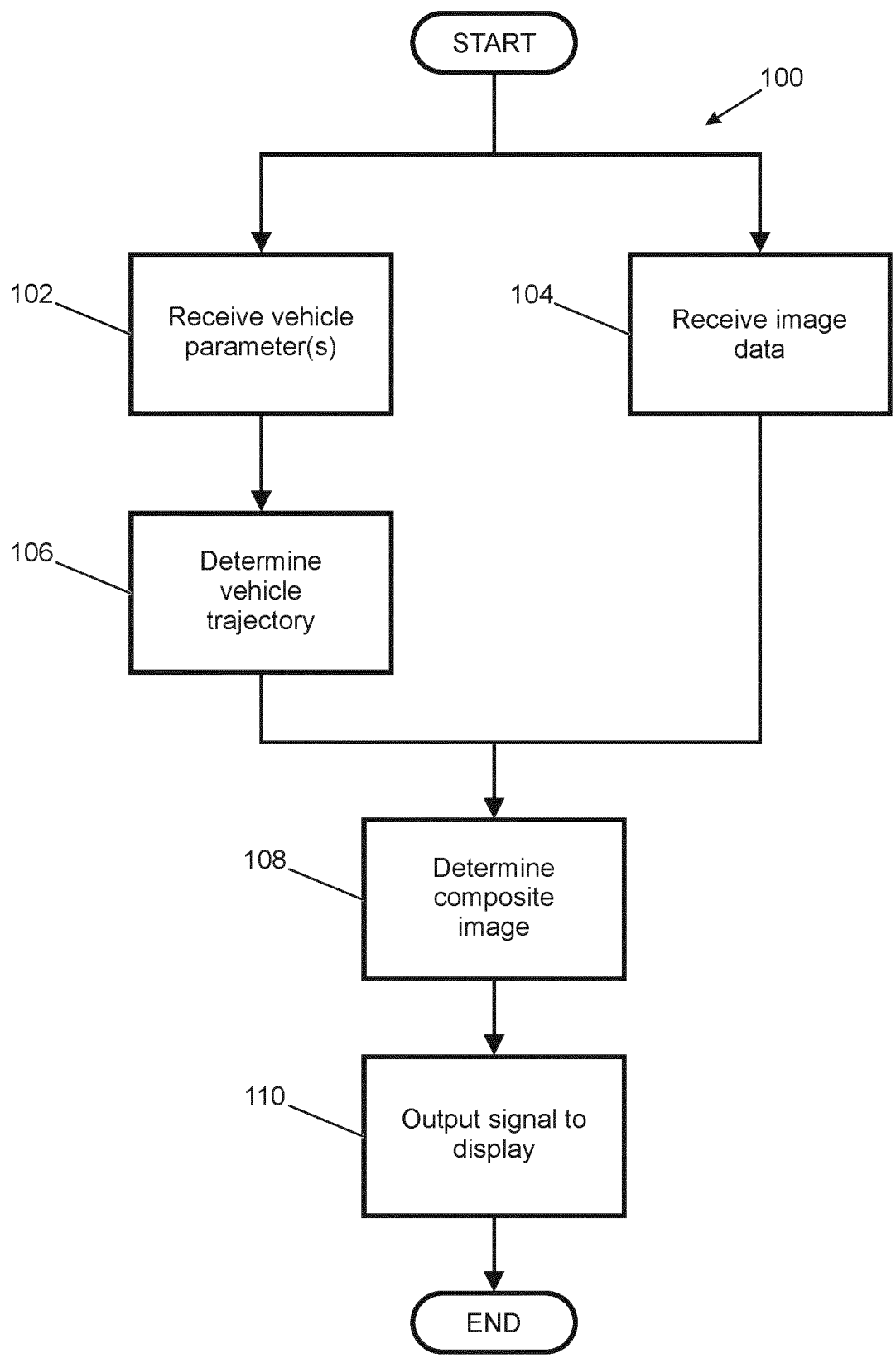
FIG. 3 is a flowchart illustrating an embodiment of a method in accordance with the present invention.

An embodiment of a method 100 in accordance with the invention will now be described with reference to FIG. 3.

The method comprises receiving 102 one or more vehicle parameters. As described herein, the one or more parameters may be received from a vehicle system and relate to the motion of the vehicle. At 104, the method comprises receiving image data from an imaging device. Typically, this comprises receiving image data from a camera mounted on or within the vehicle configured to capture images of an environment external to the vehicle. It will, however, be appreciated that the method may comprise receiving image data from a plurality of imaging devices. At 106, the method comprises determining a vehicle trajectory (as discussed in more detail below). The vehicle trajectory is determined in dependence on the received one or more vehicle parameters. At 108, the method comprises determining a composite image sequence. The composite image sequence comprises a sequence of image frames, each image frame comprising a captured image (received from the imaging device) and a trajectory indicator indicative of the determined vehicle trajectory. At 110, a control signal indicative of the composite image sequence is output to a display for displaying the composite image sequence to an occupant of the vehicle.

In determining the composite image sequence, the method 100 comprises moving the trajectory indicator from a first position in a first image frame of the composite image sequence, to a second position in a second image frame of the composite image sequence in dependence on a distance travelled by the vehicle between the time at which an image associated with the first image frame is captured and a time at which an image associated with the second image frame is captured. In this way, the trajectory indicator is made to appear substantially stationary in a direction of travel of the vehicle with respect to one or more image objects within the composite image sequence, the one or more image objects being external to the vehicle. Determination of the composite image sequence is discussed in detail below with reference to FIGS. 4-9.

Figure 4:
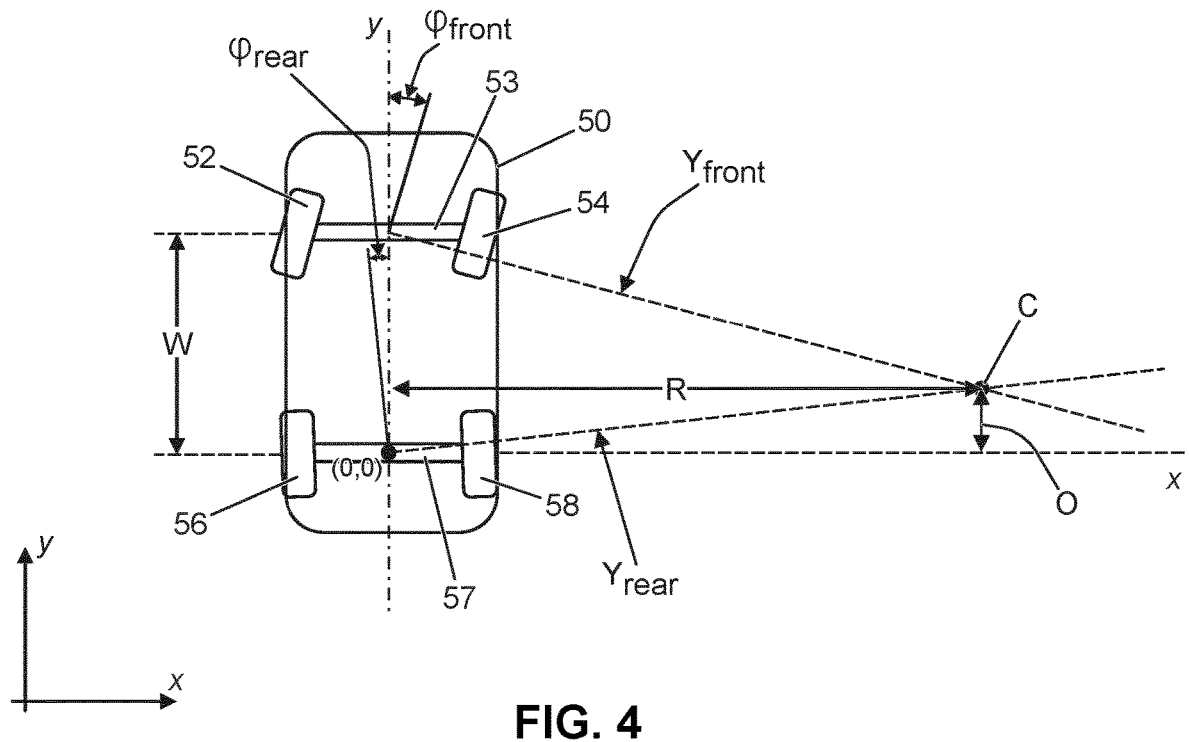
FIG. 4 illustrates an example method for use in embodiments of the present invention.

FIG. 4 illustrates a method for determining a vehicle trajectory. Specifically FIG. 4 shows how a Bicycle Model is used to model the trajectory of a vehicle 50.

In the model shown in FIG. 4, the vehicle 50 comprises four steerable wheels 52, 54, 56, 58, two front wheels 52, 54 associated with a front axle 53 of the vehicle 50, and two rear wheels 56, 58 associated with a rear axle 57 of the vehicle 50. In this example, the front wheels 52, 54 are configured to be steered at the same angle, $\varphi_{front}$ with respect to longitudinal axis of the vehicle, y. Accordingly, front wheels 52, 54 can be modelled as a single wheel positioned at the centre of the front axle 53 at an angle front with respect to longitudinal axis of the vehicle, y. Similarly, the rear wheels 56, 58 are configured to be steered at the same angle, $\varphi_{rear}$ with respect to longitudinal axis of the vehicle, y. Accordingly, rear wheels 56, 58 can be modelled as a single wheel positioned at the centre of the rear axle 57 at an angle $\varphi_{rear}$ with respect to longitudinal axis of the vehicle, y.

It will be appreciated that the vehicle 50 may comprise other steering configurations each requiring to be modelled in a similar but different way. For example, where a vehicle comprises only two steerable wheels, e.g. front wheels 52, 54, with the rear wheels 56, 58 being rotationally fixed with respect to the longitudinal axis of the vehicle y, the front wheels 52, 54 can be modelled as described above. The rear wheels 56, 58 can be modelled as a single wheel positioned at the centre of the rear axle 57 at an angle of 0° with respect to longitudinal axis of the vehicle, y. Where each of the wheels 52, 54, 56, 58 are steerable by different angles with respect to one another, each must be modelled individually.

The model shown in FIG. 4 is used to determine a centre of rotation C for the vehicle 50 in dependence on the steering angle front of the front wheels 52, 54 and the steering angle $\varphi_{rear}$ of the rear wheels 56, 58. Defining the frame of reference with respect to the longitudinal axis y and the lateral axis x of the vehicle 50, with the origin at the centre of the rear axle 57, the centre of rotation C of the vehicle 50 is determined as the point of intersection of the straight lines $Y_{front}$, $Y_{rear}$ passing through the centres of the front and rear axles 53, 57, normal to the steering directions of the relevant axles 53, 57. The equations of these lines are given by the following equations:

$$Y_{front}=\tan(\varphi_{front}) \cdot x + W \qquad \text{[Equation 1]}$$

$$Y_{rear}=\tan(\varphi_{rear}) \cdot x \qquad \text{[Equation 2]}$$

where W is the wheelbase of the vehicle 50. Solving Equations 1 and 2 for x and Y gives the centre of rotation C, where x=R (radius) and Y=O (offset from lateral axis).

Figure 5:
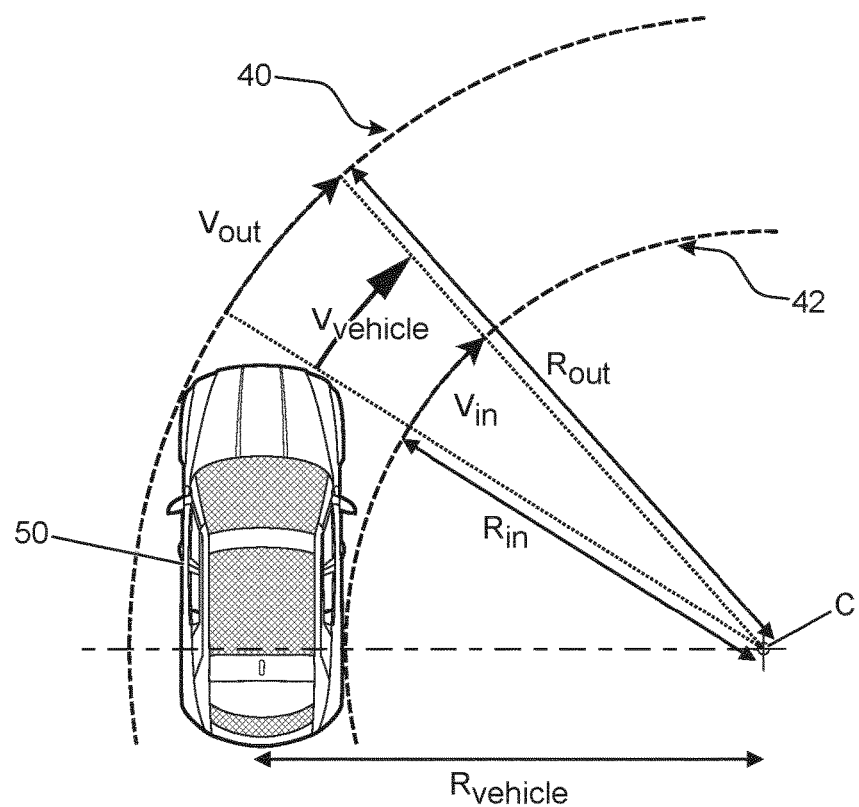
FIG. 5 illustrates an example method for use in embodiments of the present invention.

Once the centre of rotation C has been found, the trajectory of the vehicle 50 is defined as a circle about the centre of rotation C at a radius R. This is shown in FIG. 5 by a trajectory indicator in the form of a pair of parallel trajectory lines 40, 42. A first trajectory line 40 represents a predicted path to be traversed by a first point on the vehicle 50 and a second trajectory line 42 represents a predicted path to be traversed by a second point on the vehicle 50. Typically, and as shown in FIG. 5, the first point on the vehicle 50 will be the point on the vehicle which is furthest in distance from the identified centre of rotation C. This will typically be the far-side front corner of the vehicle 50, where "far-side" refers to the side of the vehicle 50 furthest from the centre of rotation C. The second point on the vehicle 50 may correspond to the nearside rear wheel of the vehicle 50, where "nearside" refers to the side of the vehicle 50 closest to the centre of rotation C. In embodiments, the trajectory lines 40, 42 represent a predicted path traversed by other vehicle components. For example, the first trajectory line 40 represents a predicted path to be traversed by a first front wheel of the vehicle 50, and the second trajectory line 42 represents a predicted path to be traversed by a second front wheel of the vehicle 50.

The linear speed of the vehicle 50 may be used to determine an angular velocity, $v_{vehicle}$, of the vehicle 50 when moving along the determined trajectory, using the following:

$$v_{vehicle} = \frac{V_{linear}}{R_{vehicle}} \quad \text{[Equation 3]}$$

where $V_{liner}$ is the linear speed of the vehicle (which may be determined from the one or more vehicle parameters as described herein), and $R_{vehicle}$ is the perpendicular distance between the longitudinal axis of the vehicle 50 and the centre of rotation C. This equation may be used to determine the angular velocity of any point on the vehicle, for instance the first point and second point for defining first and second trajectory lines 40, 42.

For calculating the angular velocity, $v_{out}$, of the point on the vehicle 50 defining the first trajectory line 40, the following equation may be used:

$$v_{out} = \frac{V_{linear}}{R_{out}} \quad \text{[Equation 4]}$$

where $R_{out}$ is radius of curvature of the first trajectory line 40 about the centre of rotation C.

For calculating the angular velocity, $v_{in}$, of the point on the vehicle 50 defining the second trajectory line 42, the following equation may be used:

$$v_{in} = \frac{V_{linear}}{R_{in}} \quad \text{[Equation 5]}$$

where $R_{in}$ is the radius of curvature of the second trajectory line 42 about the centre of rotation C.

The extent to which the trajectory lines 40, 42 are required to be moved within the composite image sequence is different for each of the lines 40, 42 in the case where a steering angle is applied to the vehicle 50. When the vehicle is travelling in a straight line (i.e. forwards or backwards along the longitudinal axis of the vehicle), $R_{out}=R_{in}$ (the centre of rotation C sits on the longitudinal axis of the vehicle), meaning that $V_{out}=V_{in}$ and the distance travelled by a first point on the vehicle 50 (e.g. the farside front corner) along the first trajectory line 40 is the same as the distance travelled by a second point on the vehicle 50 (e.g. the near side rear wheel) along the second trajectory line 42. However, when any steering angle is applied, $V_{out}$ is less than $V_{in}$. Similarly, the distance travelled by a first point on the vehicle 50 (e.g. the farside front corner) along the first trajectory line 40 is different to the distance travelled by a second point on the vehicle 50 (e.g. the near side rear wheel) along the second trajectory line 42.

The angular velocity of the relevant points of the vehicle 50 which define the position of trajectory lines 40, 42 may be used to determine the distance by which the lines 40, 42 must be moved within the composite image sequence between image frames in order for the trajectory indicator to appear fixed with respect to image objects external to the vehicle 50. Specifically, and as described throughout the specification, the trajectory indicator is moved between image frames within the composite image sequence in dependence on a distance travelled by the vehicle 50 between the time at which images corresponding to the relevant image frames are captured. This may be achieved by determining the distance travelled by each of the points on the vehicle defining the trajectory lines 40, 42 in the time between capturing a first image associated with a first image frame and a second image associated with a second image frame, and moving the corresponding line 40, 42 (or a section or segment of the line 40, 42—see FIG. 6 and the accompanying description, below) within the composite image sequence, in particular from a first position within the first and a second position in the second image frame, by a distance proportional to the determined distance travelled by the corresponding point on the vehicle 50. This process may be repeated over any number of image frames to create the composite image sequence. The same effect may also be achieved by moving the trajectory lines 40, 42 (or line section/segments within the composite image sequence at a velocity proportional to the determined angular velocity of the corresponding point on the vehicle 50 about the centre of rotation C Specifically, the trajectory lines 40, 42 or line sections/segments thereof are moved within the composite image sequence in a direction or with a velocity which is proportional, but in an opposite sense to the direction of motion or velocity of the vehicle 50. In this way, the present invention results in a trajectory indicator which appears substantially stationary in the direction of motion of the vehicle with respect to one or more image objects external to the vehicle. The effect to the user is that the vehicle 50 appears to travel over a stationary trajectory indicator. This is believed to provide to a user a more natural and less confusing representation of the vehicle's movement through the environment.

Figure 6:
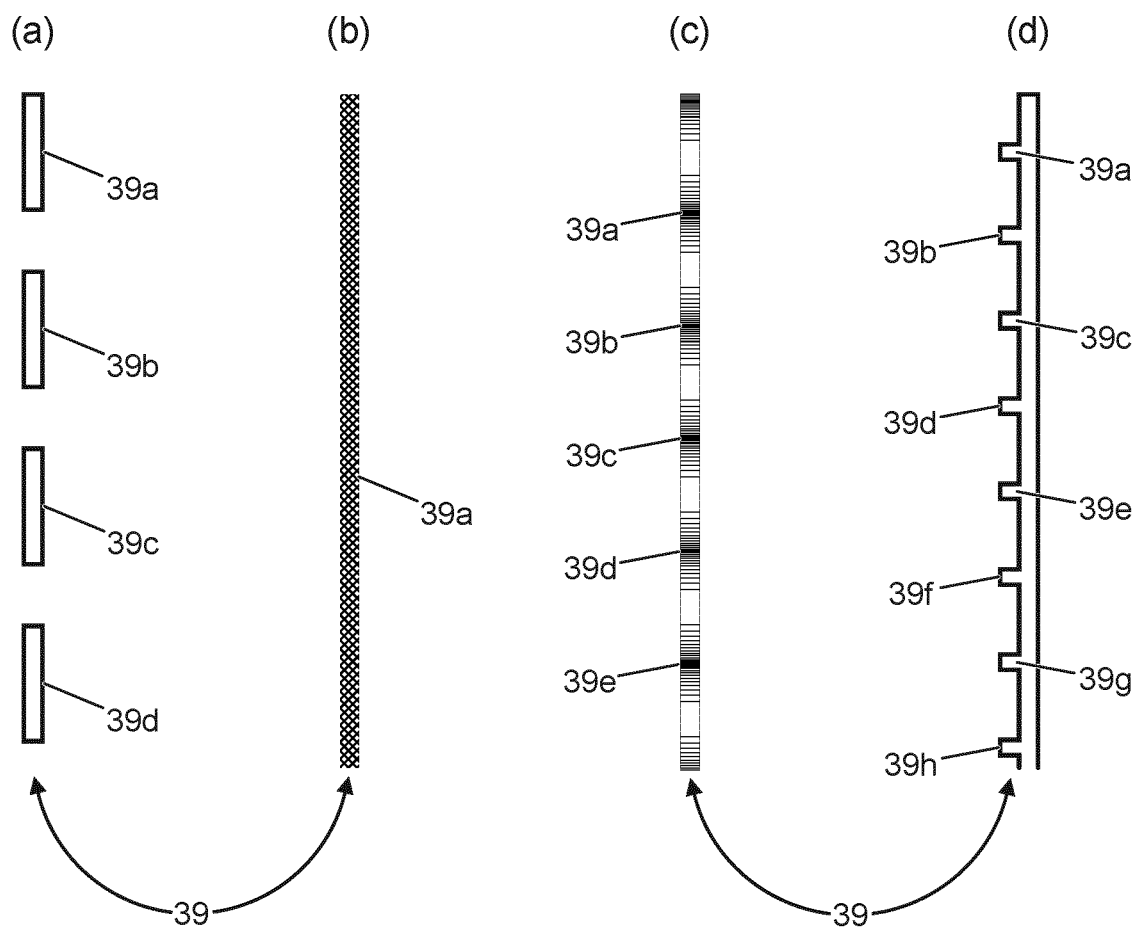
FIG. 6 illustrates different types of trajectory indicator which may be used in embodiments of the present invention.

FIG. 6 illustrates different types of trajectory indicator 39 which may be used in embodiments of the present invention.

FIG. 6(*a*) illustrates a trajectory indicator 39 which comprises a plurality of distinct indicator sections 39*a*, 39*b*, 39*c*, 39*d*. In embodiments using the trajectory indicator 39 as shown in FIG. 6(*a*), each of the indicator sections 39*a*, 39*b*, 39*c*, 39*d* may be moved within the composite image sequence in dependence on the movement of the vehicle such that the trajectory indicator 39 appears substantially stationary in a direction of travel of the vehicle with respect to the one or more image objects within the composite image sequence, as is described herein. For example, each of the indicator sections 39*a*, 39*b*, 39*c*, 39*d* may be moved from respective first positions within a first image frame of the composite image sequence, to respective second positions within the second image frame of the composite image sequence in dependence on a distance travelled by the vehicle 50 between the time at which an image associated with the first image frame is captured and the time at which an image associated with the second image frame is captured such each indicator section 39*a*, 39*b*, 39*c*, 39*d* appears substantially stationary in the direction of travel of the vehicle 50 within the composite image sequence with respect to the one or more image objects.

FIG. 6(*b*) illustrates a trajectory indicator 39 which comprises only a single indicator section 39*a*. The section includes a hatched pattern. In embodiments using the trajectory indicator 39 shown in FIG. 6(*b*), the position of the single indicator section 39*a* may be changed in dependence on the movement of the vehicle such that the trajectory indicator 39 appears substantially stationary in a direction of travel of the vehicle with respect to the one or more image objects within the composite image sequence, as is described herein. The provision of the hatched pattern provides a visual indication to the user of the system of the relative position of the trajectory indicator 39 within the composite image sequence which would not be provided were the trajectory indicator 39 to comprise a single monochrome indicator section, for example.

FIG. 6(c) illustrates a trajectory indicator 39 which comprises a plurality of indicator sections 39a, 39b, 39c, 39d, 39e in the form of a pattern of shaded and unshaded regions along a trajectory line. In embodiments using the trajectory indicator 39 as shown in FIG. 6(c), each of the indicator sections 39a, 39b, 39c, 39d, 39e, in this case the shaded regions, may be moved within the composite image sequence, specifically along the trajectory line in dependence on the movement of the vehicle such that the trajectory indicator 39 appears substantially stationary in a direction of travel of the vehicle with respect to the one or more image objects within the composite image sequence, as is described herein. For example, each of the indicator sections 39a, 39b, 39c, 39d, 39e may be moved along the trajectory line from respective first positions within a first image frame of the composite image sequence, to respective second positions within the second image frame of the composite image sequence in dependence on a distance travelled by the vehicle 50 between the time at which an image associated with the first image frame is captured and the time at which an image associated with the second image frame is captured such each indicator section 39a, 39b, 39c, 39d, 39e appears substantially stationary in the direction of travel of the vehicle 50 within the composite image sequence.

FIG. 6(d) illustrates a trajectory indicator 39 which comprises a plurality of indicator sections 39a, 39b, 39c, 39d, 39e, 39f, 39g, 39h in the form of a series of notches along a trajectory line. In embodiments using the trajectory indicator 39 as shown in FIG. 6(d), each of the indicator sections 39a, 39b, 39c, 39d, 39e, 39f, 39g, 39h, in this case the notches, may be moved within the composite image sequence, specifically along the trajectory line in dependence on the movement of the vehicle such that the trajectory indicator 39 appears substantially stationary in a direction of travel of the vehicle with respect to the one or more image objects within the composite image sequence, as is described herein. For example, each of the indicator sections 39a, 39b, 39c, 39d, 39e, 39f, 39g, 39h may be moved along the trajectory line from respective first positions within a first image frame of the composite image sequence, to respective second positions within the second image frame of the composite image sequence in dependence on a distance travelled by the vehicle 50 between the time at which an image associated with the first image frame is captured and the time at which an image associated with the second image frame is captured such each indicator section 39a, 39b, 39c, 39d, 39e, 39f, 39g, 39h appears substantially stationary in the direction of travel of the vehicle 50 within the composite image sequence with respect to the one or more image objects.

Figure 7A:
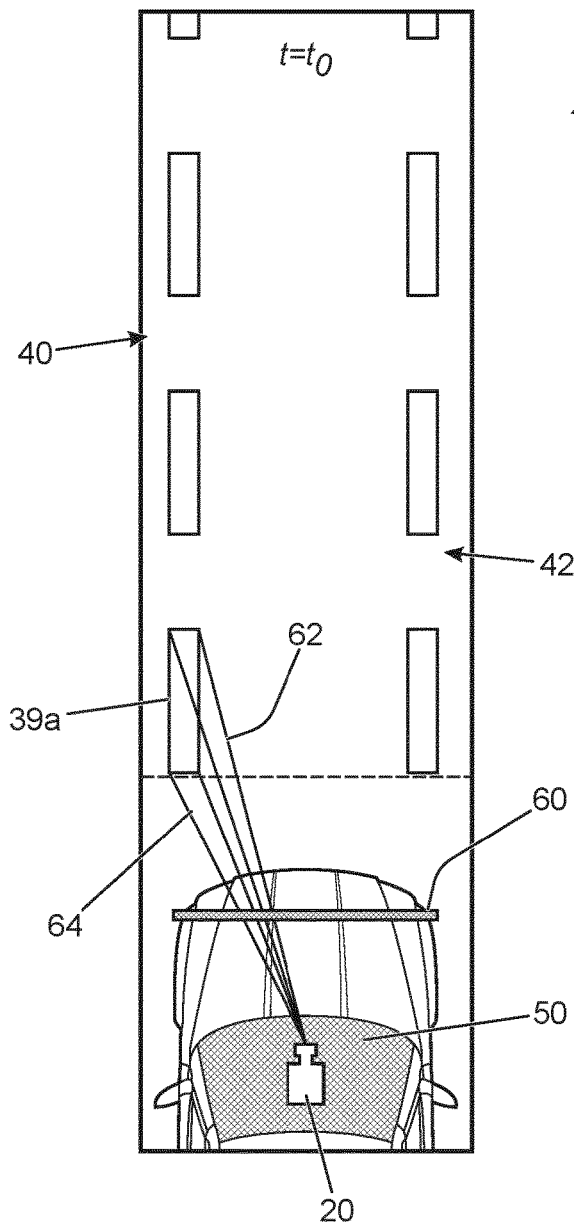
FIGS. 7A & 7B illustrate an example method for use in embodiments of the present invention.
Figure 7B:
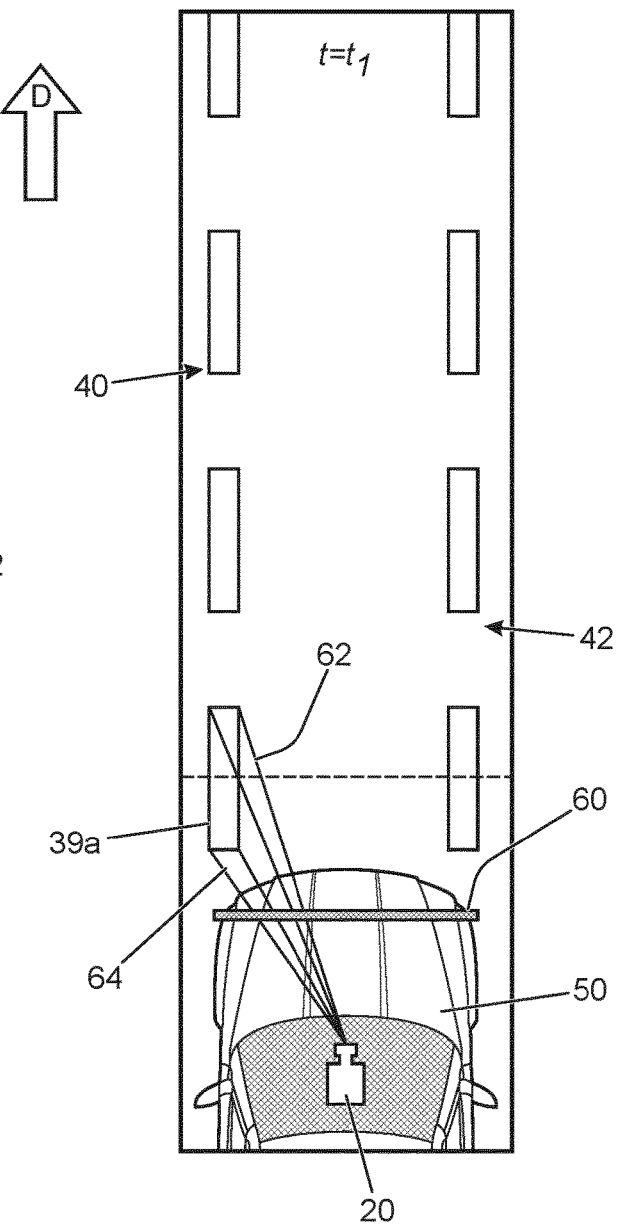

A method of controlling the position of the trajectory indicator between image frames of the composite image sequence to convey movement of the trajectory indicator within the composite image sequence is illustrated in FIGS. 7A and 7B. These Figures show the position of a camera 20, and virtual display 60 with respect to the vehicle 50, and projection outlines 62, 64. The projections outlines 62, 64 link the position of a trajectory indicator section 39a to the position of the camera 20. Specifically, projection outline 62 links the position of a first end of the trajectory indicator section 39a to the camera 20, and projection outline 64 links the position of a second end of the trajectory indicator section 39a to the camera 20. The position at which the projection outlines 62, 64 intersect the virtual display 60 illustrates how the position of a representation of the trajectory indicator section 39a within an image/image sequence, e.g. the composite image sequence, can convey depth to a user viewing the display, as is described herein.

In FIG. 7A, a trajectory indicator in the form of two parallel trajectory lines 40, 42 is shown in a first position with respect to a vehicle 50 at time $t_0$. Likewise, in FIG. 7B the trajectory lines 40, 42 are shown in a second position with respect to a vehicle 50 at time $t_1$. Between $t_0$ and $t_1$ the vehicle has moved in direction of motion D. As described herein, in order to convey to a user that the trajectory indicator remains fixed with respect to the vehicle's environment rather than the vehicle 50, the trajectory indicator is moved within the composite image sequence to appear to move towards the vehicle 50 by a distance or at a velocity dependent on the distance travelled by the vehicle 50 between $t_0$ and $t_1$.

As shown, the projection outlines 62, 64 intersect the virtual display 60 at respective first positions at time $t_0$, as shown in FIG. 7A. With the indicator section 39a in a second position as shown in FIG. 7B (at time $t_1$), the points of intersection of the projection outlines 62, 64 with the virtual display 60 are changed. Specifically, the points of intersection move towards an edge of the virtual display 60, and provide a greater area of intersection with the virtual display 60. Accordingly, in order to convey depth within the composite image sequence, or in order to convey movement of the trajectory indicator towards the vehicle, the trajectory indicator must be moved within the composite image toward an edge of the image frame, and increased in size.

Figure 7C:
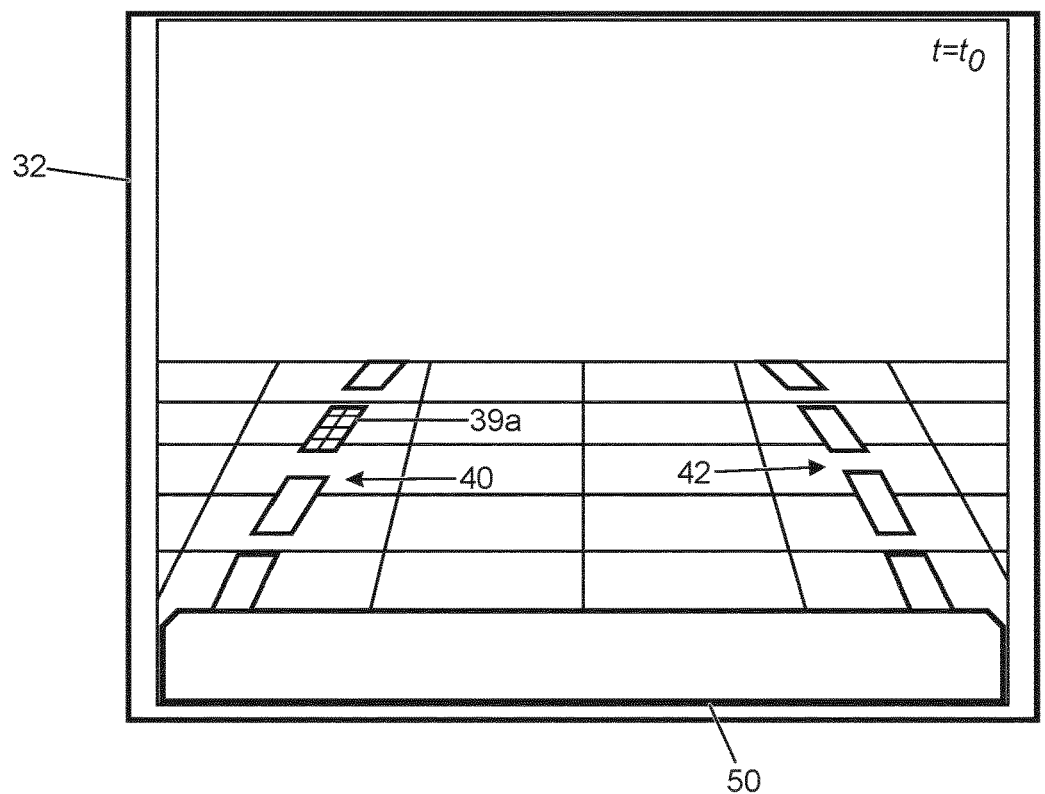
FIG. 7C illustrates the operational use of embodiments of the invention, showing a graphical representation of a composite image sequence formed in embodiments of the present invention.
Figure 7C:
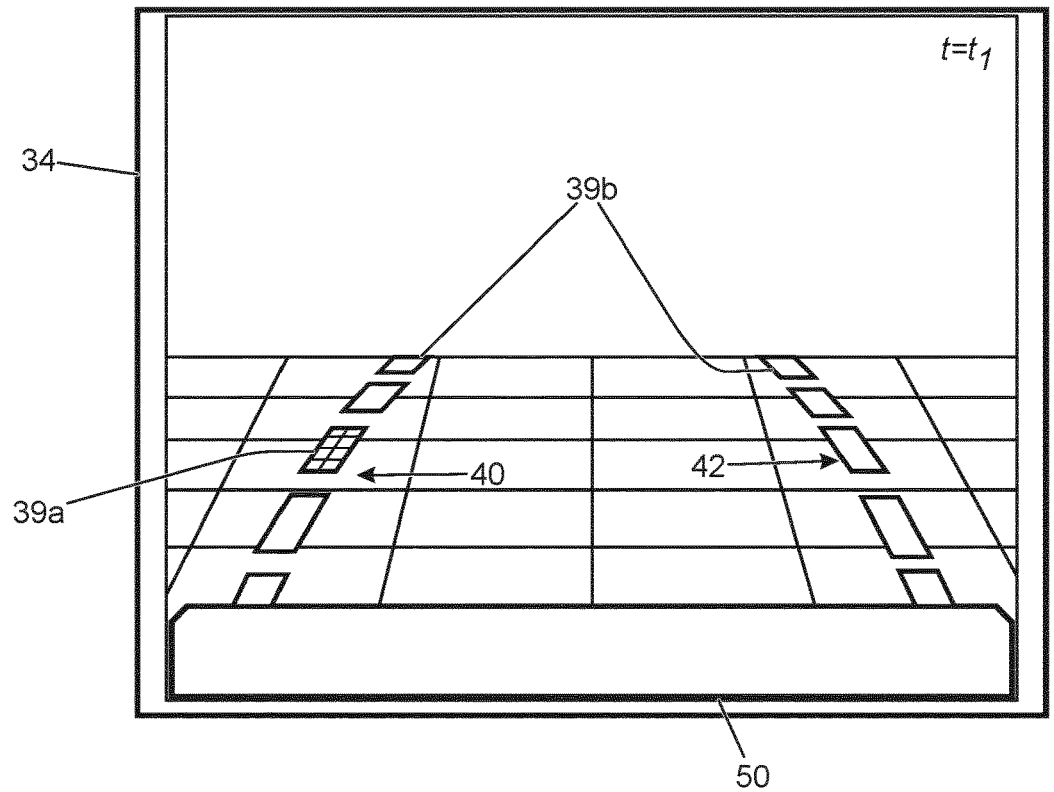

Although shown in FIGS. 7A and 7B as a 1-dimensional virtual display 60, the same technique can be applied equally for a virtual display in 2 (or more) dimensions, as will be appreciated. FIG. 7C illustrates such an embodiment.

Specifically, in FIG. 7C, a representation of a composite image sequence comprising a first image frame 32 and a second image frame 34 is shown. The first image frame 32 represents a representation of an image obtained from a camera mounted on or within, or integral to a vehicle 50 at time $t_0$. The first image frame 32 includes a trajectory indicator in the form of trajectory lines 40, 42. A single trajectory indicator section 39a is shown highlighted. Similarly, the second image frame 34 represents a representation of an image obtained from the camera at time $t_1$, subsequent to $t_0$. The second image frame 34 also includes the trajectory lines 40, 42, and indicator section 39a. Between $t_0$ and $t_1$, the vehicle 50 has moved in a longitudinal direction. Accordingly, the indicator section 39a has been moved between a first position in the first image frame 32 to a second position in a second image frame 34 in order to convey movement of the indicator section 39a with respect to the vehicle 50. Specifically, the indicator section 39a is moved towards a corner of the composite image sequence, or closer to the position of the vehicle 50 within the image sequence and towards an edge of within the image sequence. By moving the indicator section 39a by a distance within the composite image sequence in dependence on, and preferably proportional to, a distance travelled by the vehicle between time $t_0$ and $t_1$, the arrangement of the present invention can convey movement of the trajectory indicator with respect to the vehicle 50 within the composite image sequence. Or more preferably, moving the trajectory indicator within the composite image sequence such that it appears substantially stationary with respect to image objects external to the vehicle—i.e. such that the vehicle 50 appears, to a user, to drive over the trajectory indicator.

As shown in FIG. 7C, as the trajectory indicator sections, e.g. section 39a, are moved between image frames to convey movement with respect to the vehicle, new indicator sections 39b are introduced at the end of the trajectory lines 40, 42 furthest from the vehicle 50. In the illustrated embodiment, the new sections 39b are introduced to maintain a set length of the trajectory lines 40, 42. It will be appreciated, however, that new trajectory indicators 39b may be introduced to maintain the number of sections in each trajectory line 40, 42. In embodiments, the new indicator sections 39b are "faded" in, e.g. by increasing the opacity of the new sections 39b.

Figure 8A:
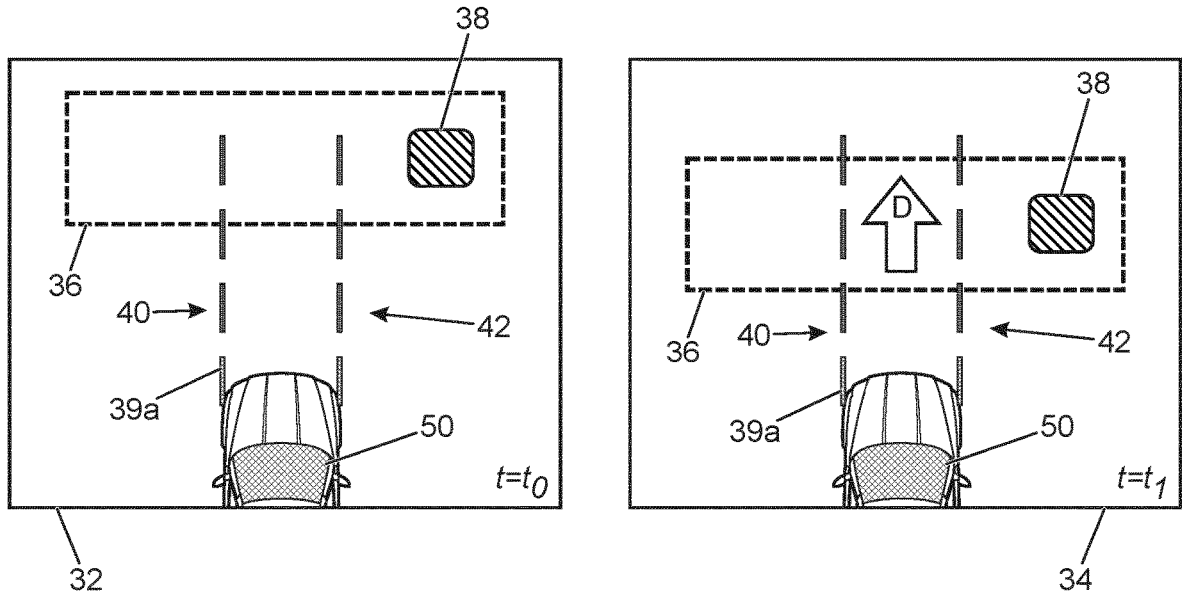
FIG. 8A is a graphical representation illustrating a composite image sequence generated using prior art systems and methods.
Figure 8B:
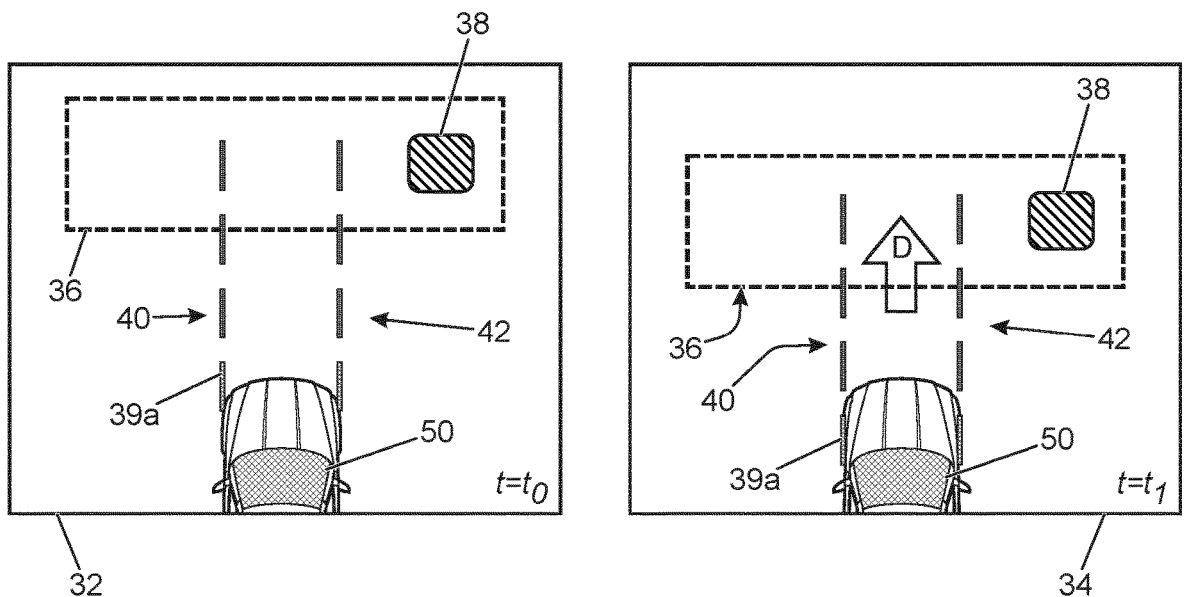
FIG. 8B illustrates the operational use of embodiments of the invention, showing a graphical representation of a composite image sequence formed in embodiments of the present invention.

FIGS. 8A & 8B show a graphical representation of a composite image sequence formed in embodiments of the present invention in comparison to composite image sequences formed using prior art systems and methods. Where like components and features are present, the same reference numerals are used in both FIGS. 8A and 8B to illustrate the differences.

The graphical representations shown in FIGS. 8A & 8B are provided from a perspective above the vehicle 50. It will be appreciated that such a representation may be provided by suitable processing of image data obtained from one or more cameras mounted on or within the vehicle 50.

FIG. 8A is an example graphical representation of a composite image sequence formed using prior art systems and methods. The representation shows a first image frame 32 comprising an image captured at time $t_0$, and a second image frame 34 comprising an image captured at time $t_1$. Within each image frame 32, 34 there is provided a graphical representation of a portion of the vehicle 50, a trajectory indicator in the form of two parallel trajectory lines 40, 42 each having a plurality of indicator sections (only 39a labelled here for conciseness). For simplicity, the trajectory lines 40, 42 are shown straight ahead of the vehicle 50 in the direction of travel D. It will, however, be appreciated that these lines 40, 42 could have any curvature in dependence on a determined trajectory of the vehicle (determined as described hereinabove, for example). Within each image frame 32, 34 there is shown the position of two image objects 36, 38 within the environment external to the vehicle 50. A first image object in the form of a section of a traversable surface (surface section) is shown by box 36. A second image object in the form of an obstacle 38 is also shown. The surface section 36 and obstacle 38 are positioned within the environment external to the vehicle and are thus captured within the images corresponding to the first and second image frames 32, 34.

Between the time at which an image associated with the first image frame 32 is captured ($t_0$), and a time at which an image associated with the second image frame 34 is captured ($t_1$), the vehicle has moved a given distance in the direction of travel D. Accordingly, within the second image frame 34 of the composite image sequence, the surface section 36 and the obstacle 38 appear comparatively closer to the front of the vehicle 50 when compared with their position in the first image frame 32. However, in such systems, the trajectory lines 40, 42 are fixed with respect to the location of the vehicle within the composite image sequence. Accordingly, and as shown in FIG. 8A, the trajectory lines 40, 42 and hence indicator sections 39a, etc. appear to move with the vehicle with respect to the surface section 36 and obstacle 38. This appears to an occupant using the system that the trajectory lines 40, 42 are 'floating' over the surface which can appear unnatural and/or confusing to the occupant as it is difficult to assess the exact correspondence of any given point on a trajectory indicator of this type and image objects external to the vehicle 50.

To overcome such issues, the present invention provides a means to 'fix' the position of the trajectory indicator with respect to one or more image objects external to the vehicle, rather than to the vehicle 50 itself. As discussed herein, this is achieved in the present invention by moving the trajectory indicator (or individual sections/segments thereof) between image frames of the composite image sequence in dependence on movement of the vehicle 50 such that the trajectory indicator appears substantially stationary in the direction of travel D of the vehicle 50 with respect to image objects 36, 38 external to the vehicle 50.

As with FIG. 8A, FIG. 8B shows a first image frame 32 comprising an image captured at time $t_0$, and a second image frame 34 comprising an image captured at time $t_1$. Similarly, within each image frame 32, 34 there is provided a graphical representation of a portion of a vehicle 50, a trajectory indicator in the form of two parallel trajectory lines 40, 42 each having a plurality of indicator sections (only 39a labelled here for conciseness). Surface section 36 and obstacle 38 are also shown and similarly are positioned within the environment external to the vehicle and are thus captured within the images corresponding to the first and second image frames 32, 34.

As shown, between $t_0$ and $t_1$, the vehicle has moved a given distance in the direction of travel D. Accordingly, within the second image frame 34 of the composite image sequence, the surface section 36 and the obstacle 38 appear comparatively closer to the front of the vehicle 50 when compared with their position in the first image frame 32. The present invention differs from the prior art system shown in FIG. 8A in that the position of the trajectory lines 40, 42, and specifically the position of the indicator sections is changed between the first and the second image frames 32, 34. Specifically, and focusing in particular on indicator section 39a (although the following applies equally to all indicator sections), indicator section 39a is moved from a first position as shown in the first image frame 32 where the indicator section 39a is mostly in front of the representation of the vehicle 50, to a second position as shown in the second image frame 34 where the indicator section 39a is presented alongside the representation of the vehicle 50. The distance between the first position of the indicator section 39a and the second position of the indicator section 39a is determined in dependence on a distance travelled by the vehicle 50 between $t_0$ and $t_1$. In embodiments, the distance between the first and second positions of the indicator section 39a may be directly proportional to the distance travelled by the vehicle 50 between to and $t_1$. In embodiments, the present invention may include performing an analysis of the images captured by the associated imaging device to determine movement of one or more image objects (e.g. surface section 36, obstacle 38). The distance between the first and second positions of the indicator section 39a may then be determined in dependence on a distance moved by the one or more image objects between image frames of the composite image sequence. In this way, the trajectory lines 40, 42 and hence indicator sections 39a, etc. appear to be fixed in position with respect to the surface section 36 and obstacle 38. This appears to an occupant using the system that the vehicle 50 is travelling over the trajectory lines 40, 42 thereby providing a better representation of the correspondence of the position of any given point on a trajectory indicator and image objects external to the vehicle 50.

Figure 9:
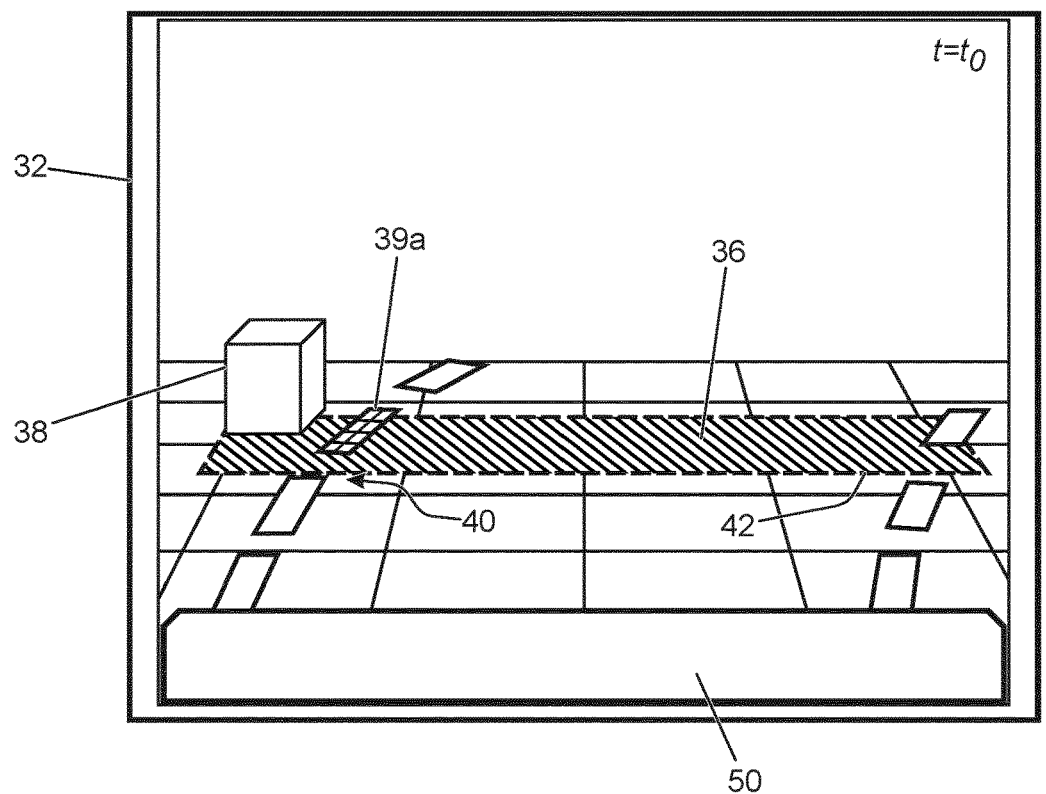
FIG. 9 illustrates the operational use of embodiments of the invention, showing a graphical representation of a composite image sequence formed in embodiments of the present invention.
Figure 9:
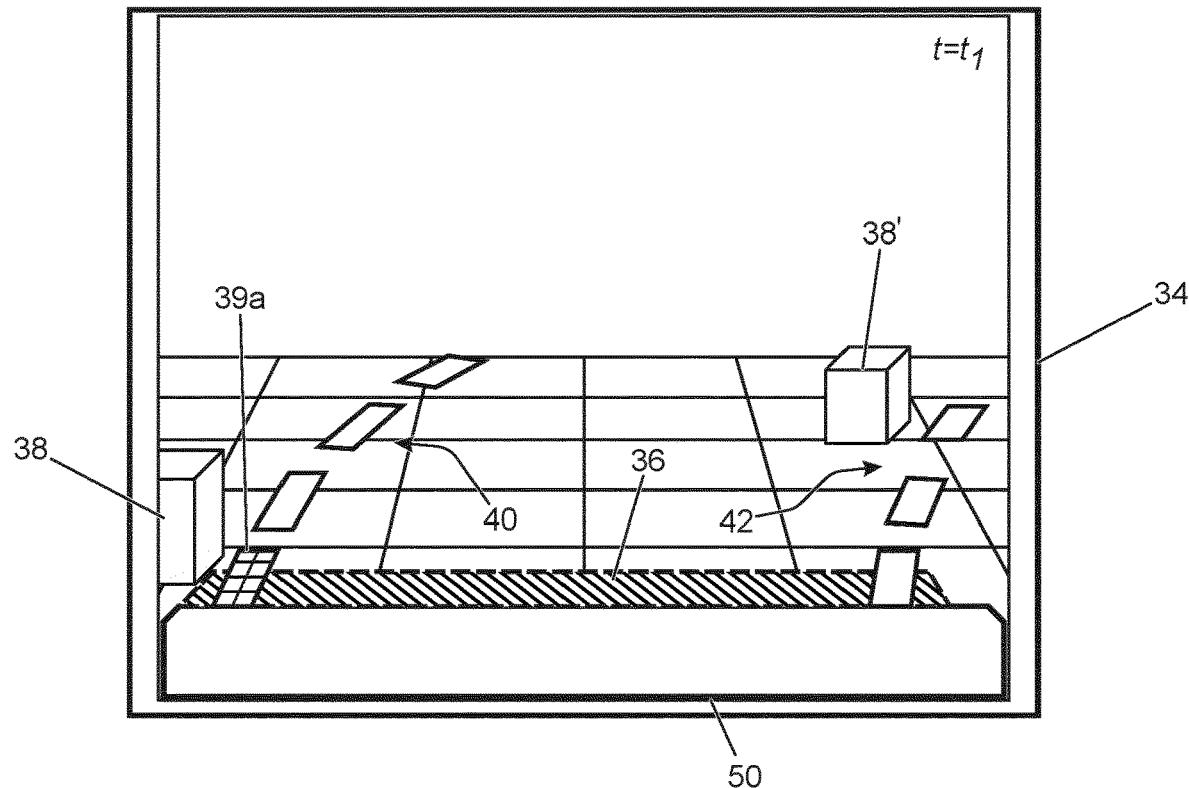

FIG. 9 illustrates an equivalent scenario as shown in FIG. 8B. However, the composite image sequence is shown from a different perspective, in this case looking out from the vehicle rather than overhead as in FIG. 8B. In addition, the trajectory lines 40, 42 are shown as curved a predicted vehicle path where a steering angle has been applied to the vehicle 50, and the second image frame 34 includes an additional obstacle 38' not visible in the first image frame 32. However, the invention may be implemented in the same way as that shown in the preceding Figures and discussed herein.

Again, between $t_0$ and $t_1$, the vehicle has moved a given distance in the direction of travel D. Accordingly, within the second image frame 34 of the composite image sequence, the surface section 36 and the obstacle 38 appear comparatively closer to the front of the vehicle 50 when compared with their position in the first image frame 32. Indicator section 39a is moved from a first position as shown in the first image frame 32 where the indicator section 39a is in front of the representation of the vehicle 50, to a second position as shown in the second image frame 34 where the indicator section 39a is presented next to and in part underneath the representation of the vehicle 50. The distance between the first position of the indicator section 39a and the second position of the indicator section 39a is determined in dependence on a distance travelled by the vehicle 50 between $t_0$ and $t_1$. In this way, the trajectory lines 40, 42 and hence indicator sections 39a, etc. appear to be fixed in position with respect to the surface section 36 and obstacle 38. This appears to an occupant using the system that the vehicle 50 is travelling over the trajectory lines 40, 42 thereby providing a better representation of the correspondence of the position of any given point on a trajectory indicator and image objects 36, 38, 38' external to the vehicle 50.

It will be appreciated that in the illustrated embodiments the movement of the trajectory indicator between image frames has been exaggerated to illustrate the operational use of the invention. It is expected that the trajectory indicator will move a relatively minimal distance between consecutive image frames as the vehicle moves within the environment. The composite image sequence preferably comprises image frames relating to image data captured at a rate high enough to convey substantially continuous movement of the vehicle within the environment. For example, the image data is captured at a rate such that a composite image sequence can be formed having an image frame rate of 50 frames per second, or higher.

A control system 510, system 530, vehicle 550 and method 600 in accordance with embodiments of the present invention are described herein with reference to the accompanying Figures.

Figure 10:
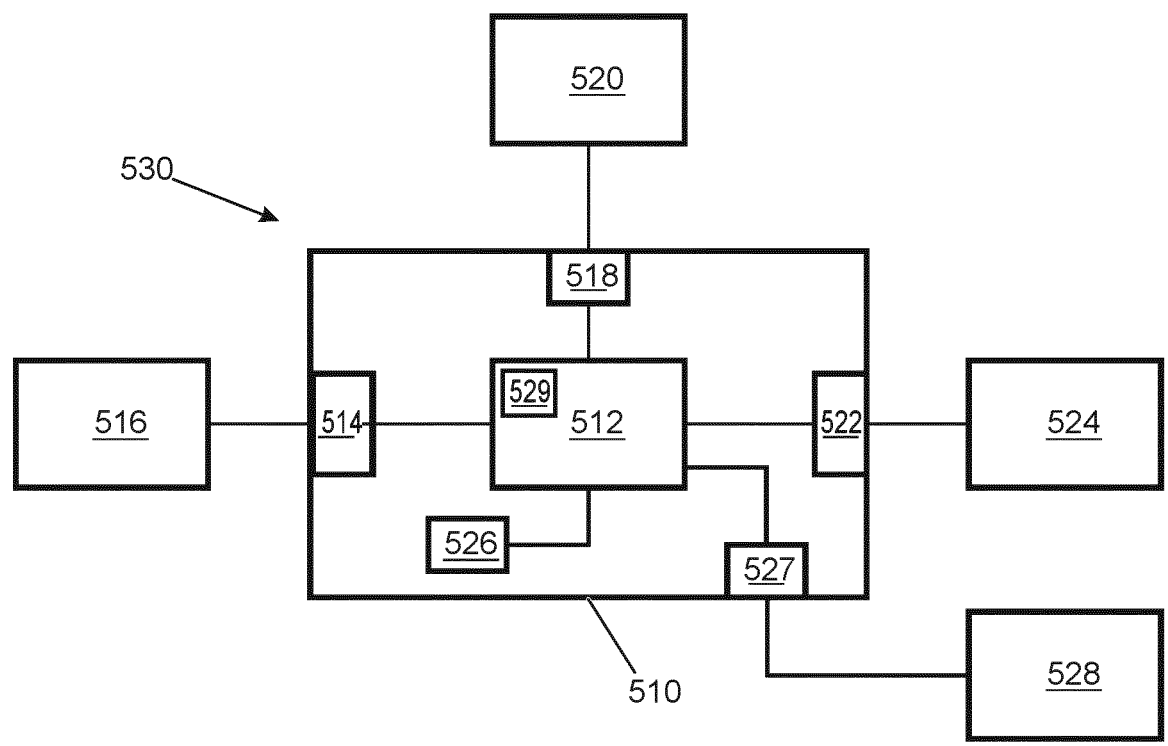
FIG. 10 shows a schematic representation of an embodiment of a control system in accordance with the present invention.

With reference to FIG. 10, a system 530 in accordance with the invention comprises a control system 510. The control system 510 is operatively coupled to a vehicle system 516, an imaging device in the form of a camera 520, one or more sensors 528 and a display 524 as shown in FIG. 10. The control system 510 includes a processor 512, memory device 526, electrical inputs 514, 518, 527, and an electrical output 522.

The camera 520 is configured to capture images of an environment external to the vehicle. As will be described herein, the control system 510 is configured to receive image data representative of the images captured by the camera 520, and use this data to determine a composite image sequence.

The vehicle system 516 may be any system capable of outputting a signal indicative of one or more vehicle parameters, specifically relating to the motion of the vehicle. The vehicle system 516 may comprise a steering system of the vehicle which may be capable of outputting a signal indicative of a steering angle of the vehicle. The steering angle may be an angular position of a steering wheel of the vehicle. Additionally, or alternatively, the steering angle may comprise an angular position of one or more steerable wheels of the vehicle. The steering angle may relate to a predicted radius of curvature of a vehicle path due to the angular position of one or more steerable wheels of the vehicle. The vehicle system 516 may comprise a braking system of the vehicle, such as an anti-lock braking system (ABS) which may be configured to output a signal indicative of a wheel speed of the vehicle, and hence a speed of the vehicle. The vehicle system 516 may comprise a power unit management system which may be configured to output a signal indicative of an engine and/or motor speed of the vehicle, for example. In use, the control system 510 may be configured to determine the vehicle trajectory in dependence on any one or more such types of vehicle parameter.

In embodiments, the vehicle system 516 is an imaging system, and may comprise the camera 520, for example. In such embodiments, the vehicle system 516 comprises an image processing unit configured to analyse movement of one or more objects within image data captured by the imaging system. Such analysis may be used to infer a speed of the vehicle relative to those objects, and hence a speed of the vehicle within the environment.

The one or more sensors 528 may comprise sensors capable of detecting obstacles, surfaces and other such objects within the environment of the vehicle, and/or information relating to the position/orientation of the vehicle within that environment. For example, the one or more sensors may comprise an imaging device such as a camera, RADAR, LIDAR, ultrasonic sensors, etc. The one or more sensors may comprise the camera 520 configured to capture images of the environment external to the vehicle. The data received from the one or more sensors 528, hereinafter referred to as topography data, may be used to map the environment external to the vehicle. For example, in embodiments the control system 510 is configured to utilise the topography data to determine a topography of a surface over which the vehicle is currently travelling or will travel were it to continue along the determined trajectory. The topography of the surface is used to determine the composite image sequence as described herein. The sensor(s) 528 may additionally include an inertial measurement unit (IMU) for determining an orientation of the vehicle along one or more axes, and/or sensors relating to a GNSS module (e.g. a GPS module) within the vehicle suitable for determining a position of the vehicle within a mapped environment.

In the illustrated embodiments described herein, the data received from the one or more sensors 528 comprises topography data, and the control system 510 is configured to receive the data from sensors 528 as "topography" data. However, it will be appreciated that in other embodiments the control system 510 may be configured to receive raw sensor data from the sensors 528. For example, in such embodiments the control system 510 may be configured to determine topography data by extracting the topography data from raw sensor data received from the sensors 528.

In use, the control system 510 receives, at electrical input 514, one or more vehicle parameters from the vehicle system 516. The one or more vehicle parameters may comprise a speed of the vehicle, velocity of the vehicle, steering angle (e.g. an angle of a steering wheel or an angle of one or more steerable wheels of the vehicle), and/or orientation of the vehicle (e.g. roll, pitch and/or yaw angle), for example. The control system 510 is further configured to receive image data, at electrical input 518, from the camera 520. The image data comprises captured images of an environment external to the vehicle. The processor 512 determines a vehicle trajectory using the received vehicle parameters, and uses the determined vehicle trajectory along with the received image data to determine a composite image sequence. Specifically, the processor 512 is configured to form a composite image sequence comprising a sequence of one or more image frames, each comprising a captured image and a trajectory indicator indicative of the determined vehicle trajectory. A control signal indicative of the composite image sequence is output via electrical output 522 to the display 524 for displaying the composite image sequence to an occupant of the vehicle.

As will be described in further detail herein, in generating the composite image sequence the control system 510 is configured to position the trajectory indicator within the composite image sequence in dependence on the received topography data. Accordingly, the control system 510 may be configured to position the trajectory indicator within the composite image sequence such that an apparent orientation of the trajectory indicator at one or more locations within the or each image frame is substantially equivalent to the orientation of the surface at the respective image frame location. Specifically, data from the sensor(s) 528 is used to determine a topography of a traversable surface within the environment of the vehicle. This is achieved by mapping, e.g. using a point cloud map, contour map, sparse map, etc. an environment using the one or more sensor(s) 528. In embodiments, the mapping of the environment is used to determine a three dimensional representation of the environment, and specifically a traversable surface within the environment of the vehicle. Overlaying or otherwise correlating the mapped topography with the images obtained by camera 520, and positioning the trajectory indicator with in dependence on the topography, ensures that, to a user, the trajectory indicator(s) appear to lie on the surface (and are fixed with respect thereto).

As will be appreciated, any process step (or method step) described herein may be performed by running computer software, e.g. computer software 529, on one or more processors 512 as shown in FIG. 10. Any such software 529 may be stored in in a location accessible by the processor 512, e.g. at memory 526.

Figure 11:
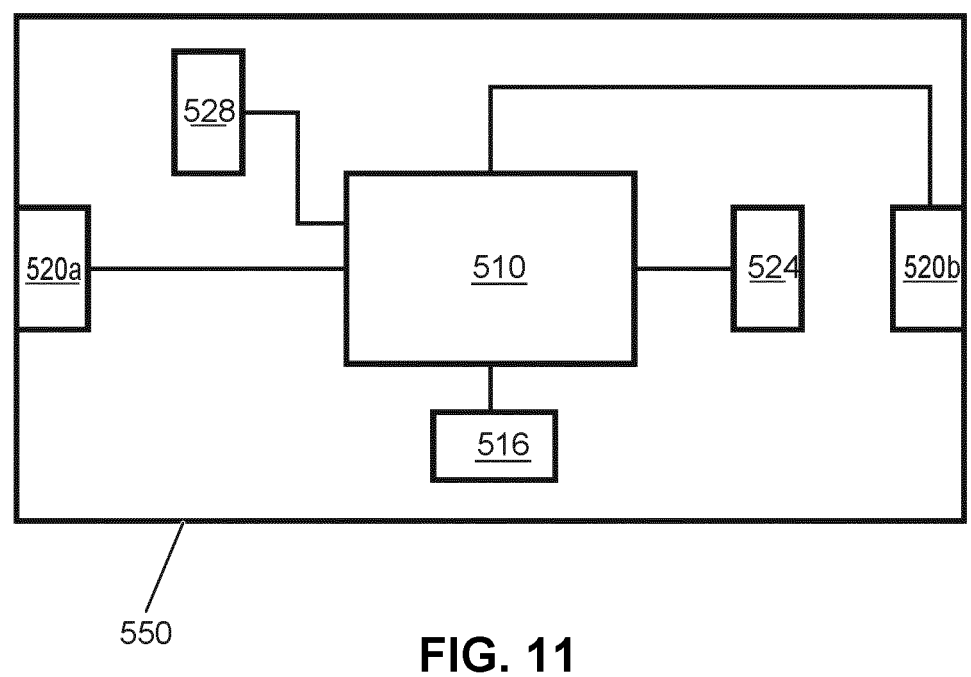
FIG. 11 shows a schematic representation of an embodiment of a vehicle in accordance with the present invention.

FIG. 11 illustrates an embodiment of a vehicle 550 in accordance with an embodiment of the invention. As shown, the vehicle 550 comprises a system 530 which includes control system 510, imaging devices in the form of cameras 520a, 520b, the vehicle system 516, sensor 528 and the display 524.

Figure 12:
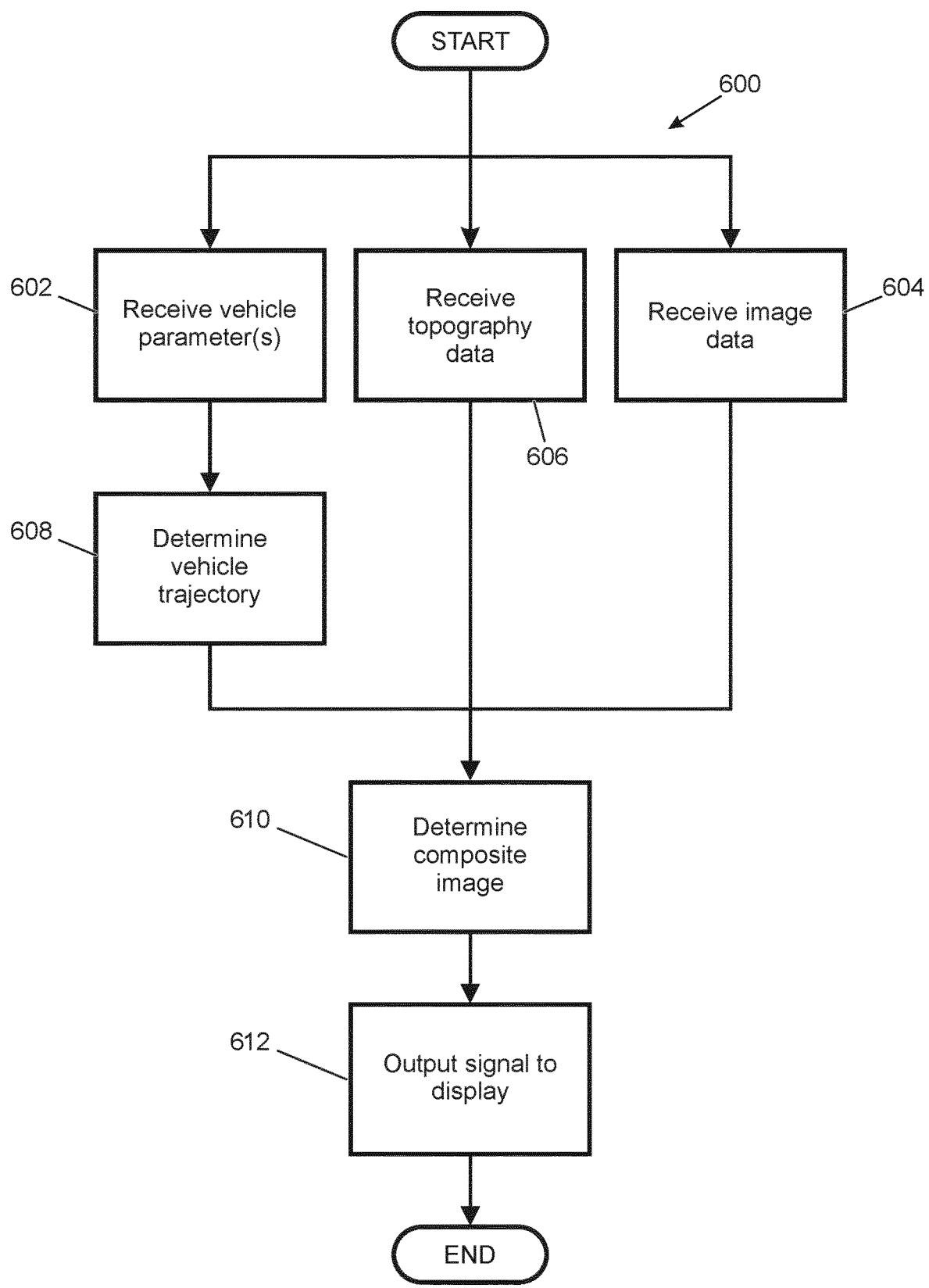
FIG. 12 is a flowchart illustrating an embodiment of a method in accordance with the present invention.

An embodiment of a method 600 in accordance with the invention will now be described with reference to FIG. 12.

The method comprises receiving 602 one or more vehicle parameters. As described herein, the one or more parameters may be received from a vehicle system and relate to the motion of the vehicle. At 604, the method comprises receiving image data from an imaging device. Typically, this comprises receiving image data from a camera mounted on or within the vehicle configured to capture images of an environment external to the vehicle. It will, however, be appreciated that the method may comprise receiving image data from a plurality of imaging devices. At 606, the method comprises receiving topography data indicative of a topography of a surface within the environment. The topography data may be received directly, or indirectly (i.e. via one or more additional vehicle systems) from the or each sensor 528. At 608, the method comprises determining a vehicle trajectory (as discussed in more detail below). The vehicle trajectory is determined in dependence on the received one or more vehicle parameters. At 610, the method comprises determining a composite image sequence. The composite image sequence comprises a sequence of one or more image frames, the or each image frame comprising a captured image (received from the imaging device) and a trajectory indicator indicative of the determined vehicle trajectory. At 612, a control signal indicative of the composite image sequence is output to a display for displaying the composite image sequence to an occupant of the vehicle.

In determining the composite image sequence, the method 600 comprises positioning the trajectory indicator at one or more locations within the or each image frame of the composite image sequence, in dependence on received topography data. In this way, the trajectory indicator may be made to appear to have substantially the same orientation as the surface within the environment at a particular image frame location. Accordingly, the trajectory indicator may be made to appear within the composite image sequence to be positioned on top of the surface, having a direct correspondence therewith. Determination of the composite image sequence is discussed in detail below.

In the illustrated embodiments described herein, the data received from the one or more sensors comprises topography data, and the method comprises receiving the data from sensors as "topography" data. However, it will be appreciated that in other embodiments the method may comprise receiving raw sensor data from the sensors. In such embodiments the method may include determining the topography data by extracting the topography data from raw sensor data received from the sensors.

Figure 13:
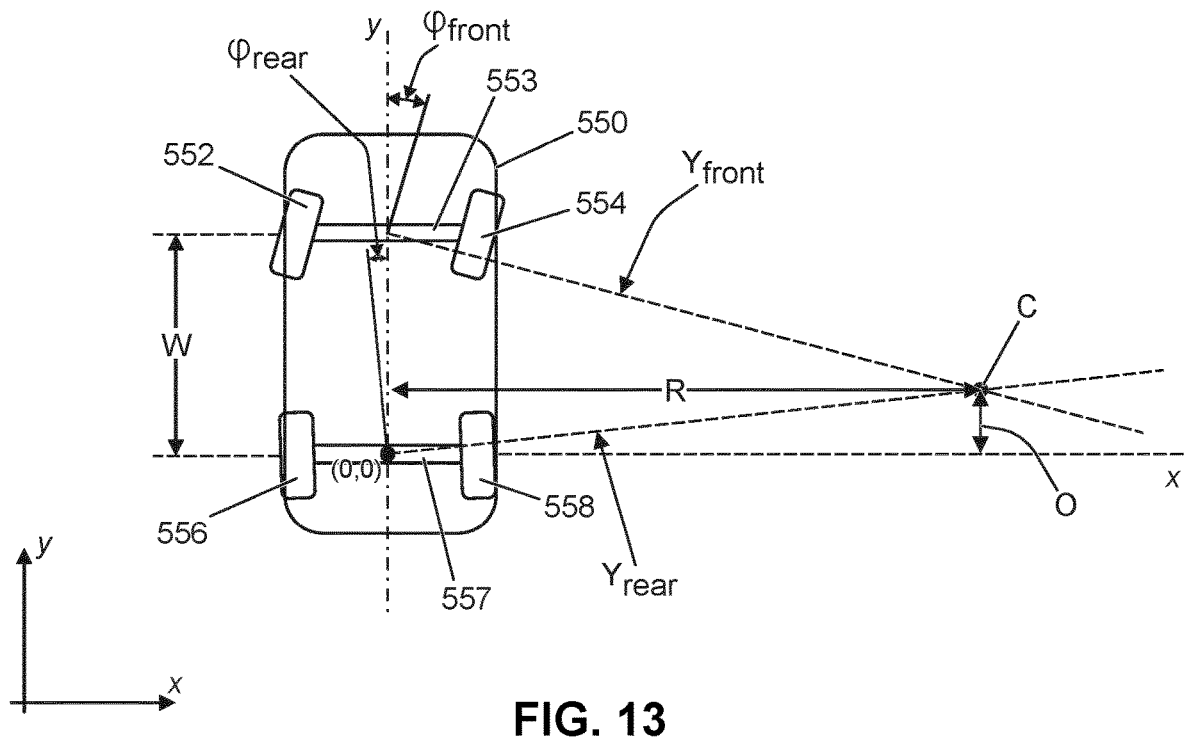
FIG. 13 illustrates an example method for use in embodiments of the present invention.

FIG. 13 illustrates a method for determining a vehicle trajectory. Specifically FIG. 13 shows how a Bicycle Model is used to model the trajectory of a vehicle 550.

In the model shown in FIG. 13, the vehicle 550 comprises four steerable wheels 552, 554, 556, 558, two front wheels 552, 554 associated with a front axle 553 of the vehicle 550, and two rear wheels 556, 558 associated with a rear axle 557 of the vehicle 550. In this example, the front wheels 552, 554 are configured to be steered at the same angle, front with respect to longitudinal axis of the vehicle, y. Accordingly, front wheels 552, 554 can be modelled as a single wheel positioned at the centre of the front axle 553 at an angle front with respect to longitudinal axis of the vehicle, y. Similarly, the rear wheels 556, 558 are configured to be steered at the same angle, $\varphi_{rear}$ with respect to longitudinal axis of the vehicle, y. Accordingly, rear wheels 556, 558 can be modelled as a single wheel positioned at the centre of the rear axle 557 at an angle $\varphi_{rear}$ with respect to longitudinal axis of the vehicle, y.

It will be appreciated that the vehicle 550 may comprise other steering configurations each requiring to be modelled in a similar but different way. For example, where a vehicle comprises only two steerable wheels, e.g. front wheels 552, 554, with the rear wheels 556, 558 being rotationally fixed with respect to the longitudinal axis of the vehicle y, the front wheels 552, 554 can be modelled as described above. The rear wheels 556, 558 can be modelled as a single wheel positioned at the centre of the rear axle 557 at an angle of 0° with respect to longitudinal axis of the vehicle, y. Where each of the wheels 552, 554, 556, 558 are steerable by different angles with respect to one another, each must be modelled individually.

The model shown in FIG. 13 is used to determine a centre of rotation C for the vehicle 550 in dependence on the steering angle front of the front wheels 552, 554 and the steering angle $\varphi_{rear}$ of the rear wheels 556, 558. Defining the frame of reference with respect to the longitudinal axis y and the lateral axis x of the vehicle 550, with the origin at the centre of the rear axle 557, the centre of rotation C of the vehicle 550 is determined as the point of intersection of the straight lines $Y_{front}$, $Y_{rear}$ passing through the centres of the front and rear axles 553, 557, normal to the steering directions of the relevant axles 553, 557. The equations of these lines are given by the following equations:

$$Y_{front} = \tan(\varphi_{front}) \cdot x + W \quad \text{[Equation 1]}$$

$$Y_{rear} = \tan(\varphi_{rear}) \cdot x \quad \text{[Equation 2]}$$

where W is the wheelbase of the vehicle 550. Solving Equations 1 and 2 for x and Y gives the centre of rotation C, where x=R (radius) and Y=O (offset from lateral axis).

Figure 14:
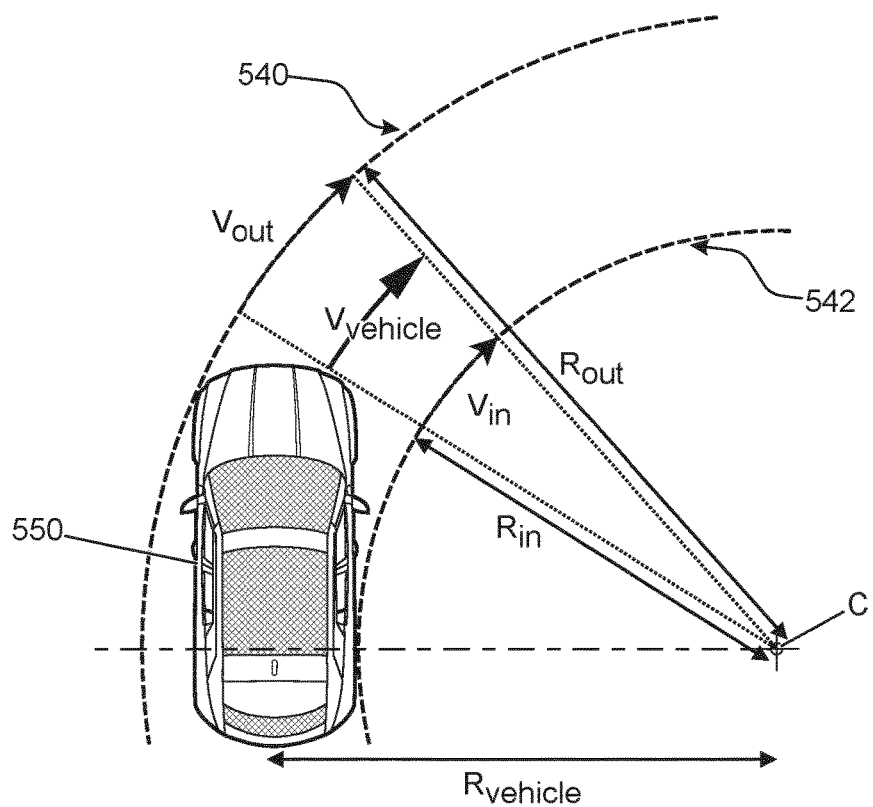
FIG. 14 illustrates an example method for use in embodiments of the present invention.

Once the centre of rotation C has been found, the trajectory of the vehicle 550 is defined as a circle about the centre of rotation C at a radius R. This is shown in FIG. 14 by a trajectory indicator in the form of a pair of parallel trajectory lines 540, 542. A first trajectory line 540 represents a predicted path to be traversed by a first point on the vehicle 550 and a second trajectory line 542 represents a predicted path to be traversed by a second point on the vehicle 550. Typically, and as shown in FIG. 14, the first point on the vehicle 550 will be the point on the vehicle which is furthest in distance from the identified centre of rotation C. This will typically be the far-side front corner of the vehicle 550, where "far-side" refers to the side of the vehicle 550 furthest from the centre of rotation C. The second point on the vehicle 550 may correspond to the nearside rear wheel of the vehicle 550, where "nearside" refers to the side of the vehicle 550 closest to the centre of rotation C. In embodiments, the trajectory lines 540, 542 represent a predicted path traversed by other vehicle components. For example, the first trajectory line 540 represents a predicted path to be traversed by a first front wheel of the vehicle 550, and the second trajectory line 542 represents a predicted path to be traversed by a second front wheel of the vehicle 550.

The linear speed of the vehicle 550 may be used to determine an angular velocity, $v_{vehicle}$, of the vehicle 550 when moving along the determined trajectory, using the following:

$$v_{vehicle} = \frac{V_{linear}}{R_{vehicle}} \quad \text{[Equation 3]}$$

where $V_{linear}$ is the linear speed of the vehicle (which may be determined from the one or more vehicle parameters as described herein), and $R_{vehicle}$ is the perpendicular distance between the longitudinal axis of the vehicle 550 and the centre of rotation C. This equation may be used to determine the angular velocity of any point on the vehicle, for instance the first point and second point for defining first and second trajectory lines 540, 542.

For calculating the angular velocity, $v_{out}$, of the point on the vehicle 550 defining the first trajectory line 540, the following equation may be used:

$$v_{out} = \frac{V_{linear}}{R_{out}} \quad \text{[Equation 4]}$$

where $R_{out}$ is radius of curvature of the first trajectory line 540 about the centre of rotation C.

For calculating the angular velocity, $v_{in}$, of the point on the vehicle 550 defining the second trajectory line 542, the following equation may be used:

$$v_{in} = \frac{V_{linear}}{R_{in}} \quad \text{[Equation 5]}$$

where $R_{in}$ is the radius of curvature of the second trajectory line 542 about the centre of rotation C.

When the vehicle is travelling in a straight line (i.e. forwards or backwards along the longitudinal axis of the vehicle), $R_{out}=R_{in}$ (the centre of rotation C sits on the longitudinal axis of the vehicle), meaning that $V_{out}=V_{in}$ and the distance travelled by a first point on the vehicle 550 (e.g. the farside front corner) along the first trajectory line 540 is the same as the distance travelled by a second point on the vehicle 550 (e.g. the near side rear wheel) along the second trajectory line 542. However, when any steering angle is applied, $V_{out}$ is less than $V_{in}$. Similarly, the distance travelled by a first point on the vehicle 550 (e.g. the farside front corner) along the first trajectory line 540 is different to the distance travelled by a second point on the vehicle 550 (e.g. the near side rear wheel) along the second trajectory line 542.

FIGS. 15A to 15D illustrate the operational use of embodiments of the present invention. Specifically, each of FIGS. 15A-D illustrate a vehicle 550 traversing a surface 536, and a position of a camera 520, and virtual display 560 with respect to the vehicle 550, and projection outlines 562, 564. The projections outlines 562, 564 link the position of a trajectory line 540 to the position of the camera 520. Specifically, projection outline 562 links the position of a first end of the trajectory line 540 to the camera 520, and projection outline 564 links the position of a second end of the trajectory line 540 to the camera 520. The position at which the projection outlines 562, 564 intersect the virtual display 560 illustrates how the position of a representation of the trajectory line 540 within an image/image sequence, e.g. the composite image sequence, can convey varying orientations of the trajectory line 540 to a user viewing the display, as is described herein.

Figure 15A:
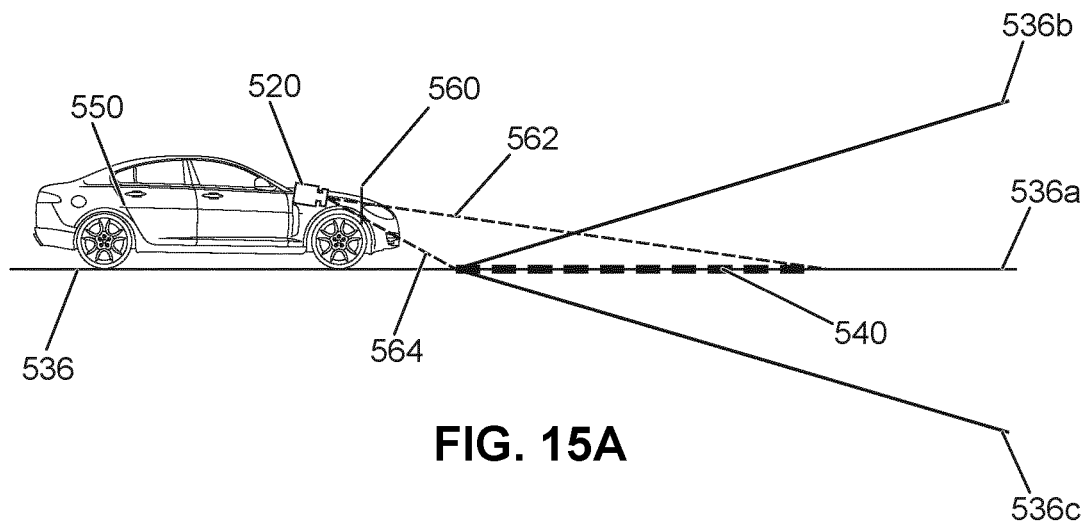
FIGS. 15A-D illustrate an operational use of embodiments of the present invention.

FIG. 15A illustrates the vehicle 550 traversing a surface 536 having a surface profile 536a, which is substantially level with respect to the orientation of the vehicle 550. Trajectory line 540 is shown having a first orientation along surface profile 536a of surface 536. FIG. 15A also illustrates the surface 536 having varying different surface profiles 536b (showing an incline in gradient ahead of the vehicle 550) and 536c (showing a decline in gradient ahead of the vehicle 550). This Figure illustrates how a trajectory line 540 may appear to be positioned either in the surface (with respect to surface profile 536b) or "floating" above the surface (with respect to surface profile 536c) if, as in prior art systems, a topography of the surface 536 is not taken into account when positioning the trajectory line 540.

Figure 15B:
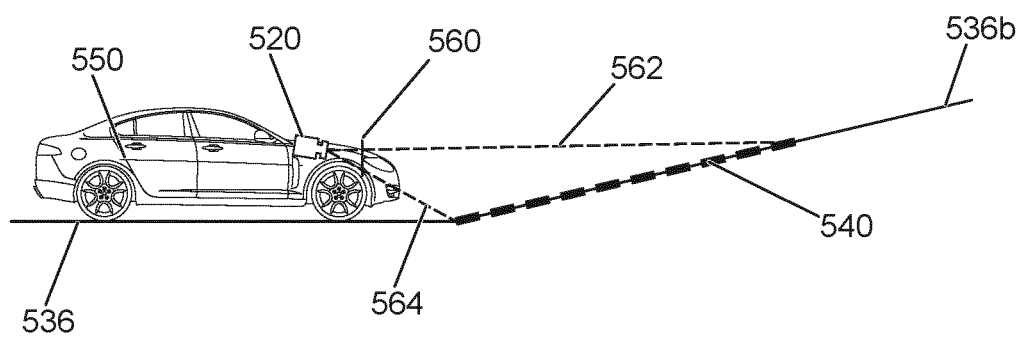

To account for this, in FIG. 15B, the trajectory line 540 is shown having a second orientation along surface profile 536b of surface 536. Likewise, in FIG. 15C, the trajectory line 540 is shown having a third orientation along surface profile 536c of surface 536. As described herein, in order to correctly position the trajectory line 540 such that, to the user, the trajectory line 540 appears to sit on top of the surface 536 rather than "floating" or positioned in the surface 536, the trajectory line 540 is oriented in dependence on topography data indicative of the topography of the surface 536.

As shown, the projection outlines 562, 564 intersect the virtual display 560 at respective first positions for surface profile 536a, respective second positions for surface profile 536b and respective third positions for surface profile 536c. Specifically, by adjusting the points of intersection of the projection outlines 562, 564 in dependence on a topography of the surface 536 it is possible to convey an apparent orientation of the trajectory line 540 within the composite image sequence.

Figure 15C:
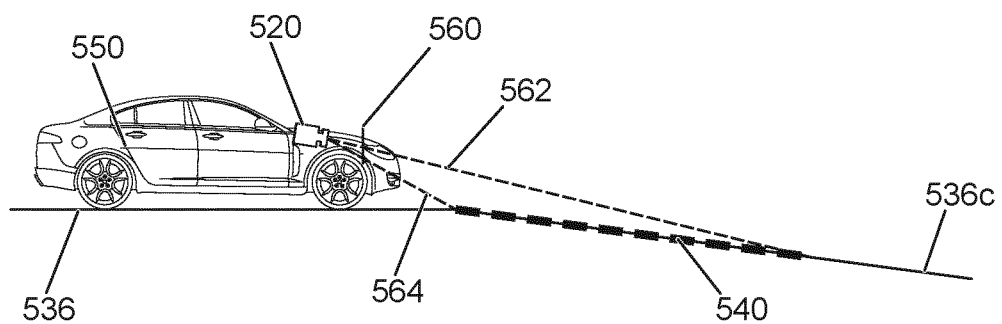
Figure 15D:
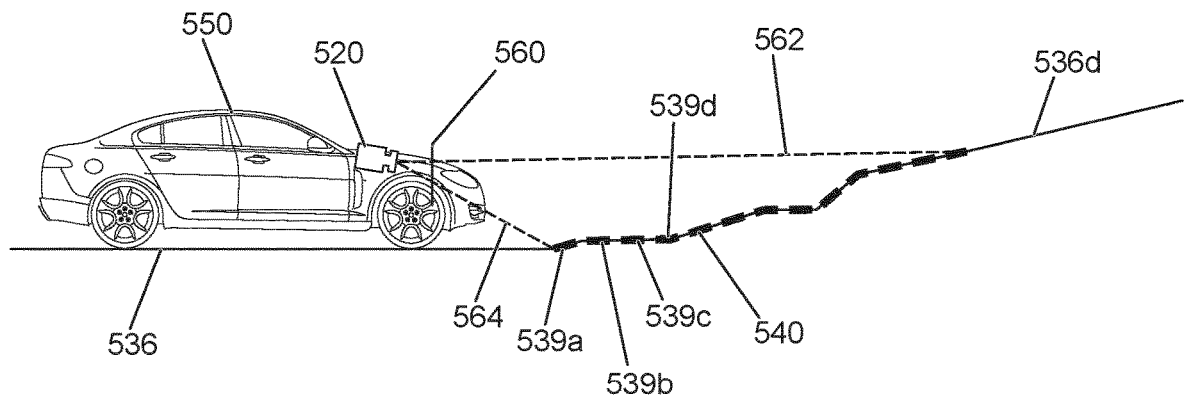

FIGS. 15A to 15C illustrate various surface profiles 536a, 536b, 536c having a substantially constant gradient. However, it will be appreciated that the invention is not limited in this sense. Equally, and as shown in FIG. 15D, the surface 536 can have a profile 536d which varies in gradient along its length. To account for this, the trajectory line 540 may be separated into indicator sections 539 (a, b, c, d, . . . ) each of which may be positioned and/or oriented independently in order to map the trajectory line 540 to the surface profile 536d. For example, each indicator section 539 (a, b, c, d, . . . ) may be moveable about respective pivot points along the trajectory of the vehicle 550.

Figure 16:
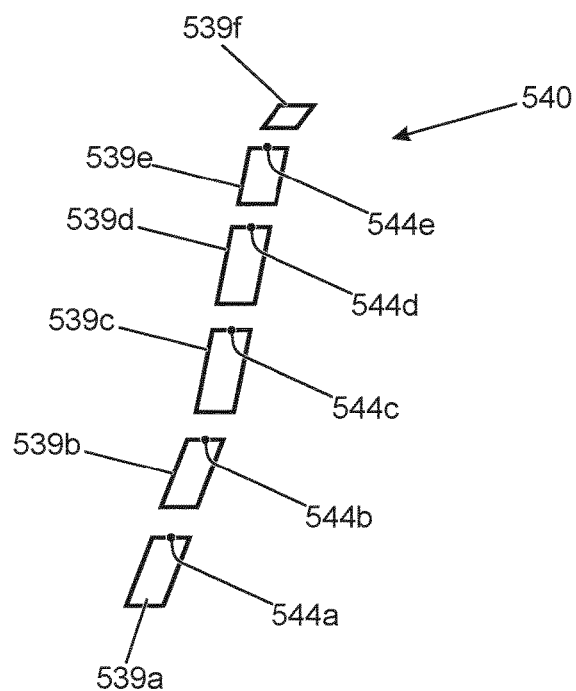
FIG. 16 illustrates an example method for use in embodiments of the present invention.

As shown in FIG. 16, in order to convey uniformity along the length of a trajectory line 540 comprising a plurality of indicator sections 539 (a, b, c, d, . . . ), each indicator section 539 (a, b, c, d, . . . ) may be moveable about a respective pivot point 544 (a, b, c, d, . . . ) associated with an end point of a preceding indicator section 539 (a, b, c, d, . . . ) in the trajectory line 540. Specifically, indicator section 539b is pivotable about pivot point 544a associated with an end point of preceding indicator section 539a, indicator section 539c is pivotable about pivot point 544b associated with an end point of preceding indicator section 539b, and so on for each indicator section 539 (a, b, c, d, . . . ) making up trajectory line 540. It will be appreciated that the indicator sections 539 (a, b, c, d, . . . ) may be pivotable about a single axis, or multiple axes, e.g. three axes, as required. Constructing a trajectory indicator in this manner ensures that any discontinuities in the trajectory lines 540, 542 can be avoided thereby conveying a more natural representation of the vehicle's trajectory over the surface 536.

Although shown in FIGS. 15A-15D as a 1-dimensional virtual display 560, the same technique can be applied equally for a virtual display in 2 (or more) dimensions, as will be appreciated. FIGS. 17 to 20 illustrate such embodiments.

FIGS. 17 to 20 illustrate representations of a composite image sequence comprising an image frame 532. The image frame 532 comprises a representation of an image obtained from a camera mounted on, within, or integral to, a vehicle 550 and a trajectory indicator in the form of trajectory lines 540, 542. Each of the trajectory lines comprises a series of trajectory indicator sections. As illustrated, the representation of the image from the camera comprises a surface 536 over which the vehicle 550 is predicted to travel. In the illustrated embodiments, the representation of the image additionally includes a surface profile in the form of a surface map illustrative of the topography of the surface. As discussed herein, the topography of the surface may be determined via image analysis of the image data obtained by the camera, or through other sensing means.

Figure 17:
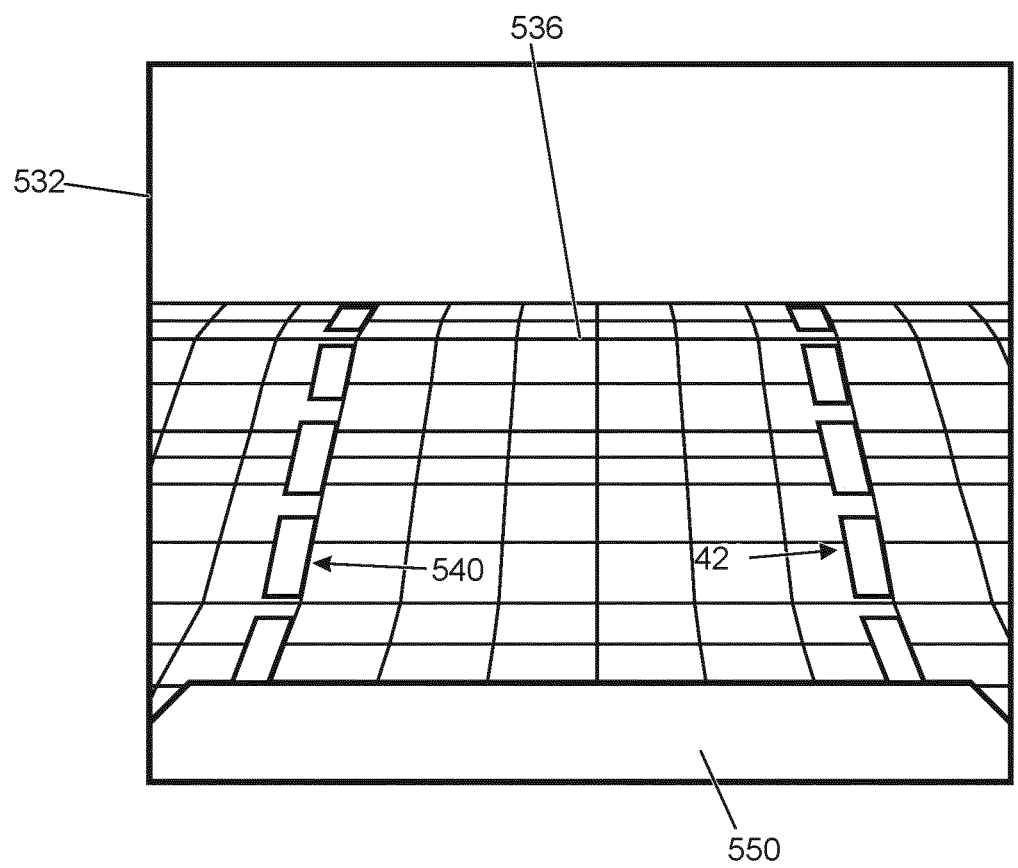
FIGS. 17-20 illustrate the operational use of embodiments of the invention, showing a series of graphical representations of composite image sequences formed in embodiments of the present invention.
Figure 18:
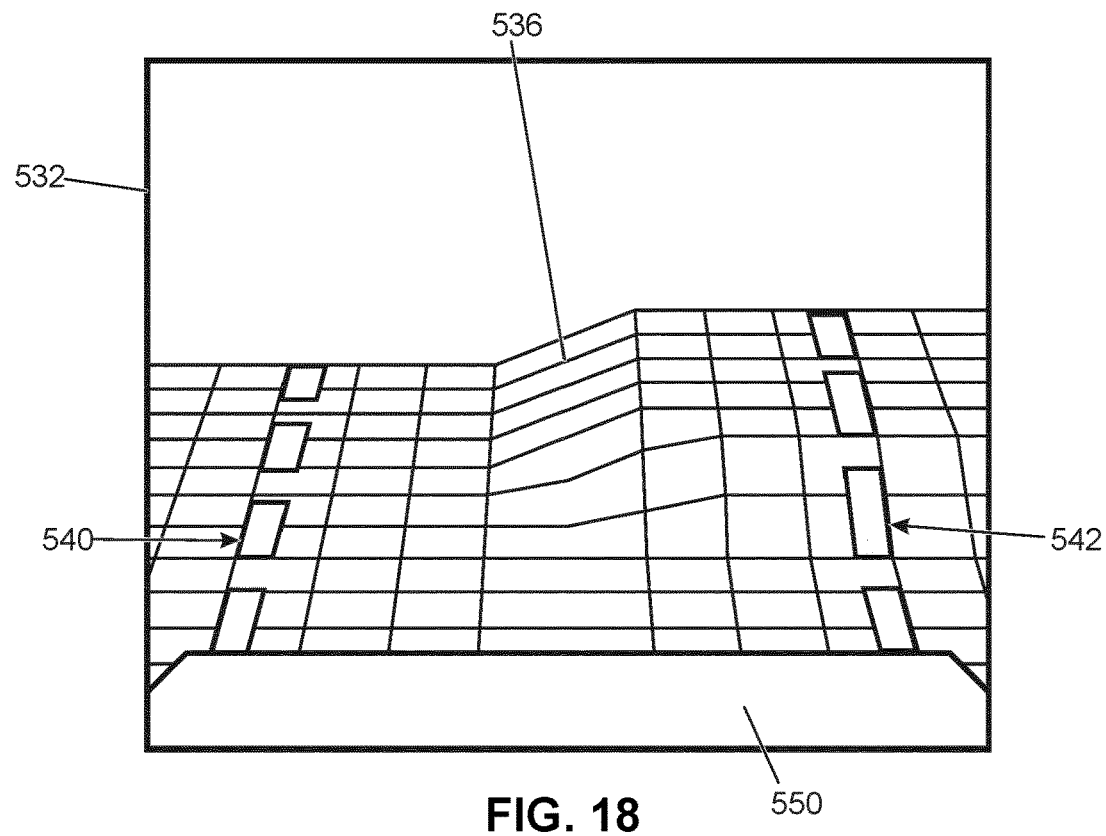
Figure 19:
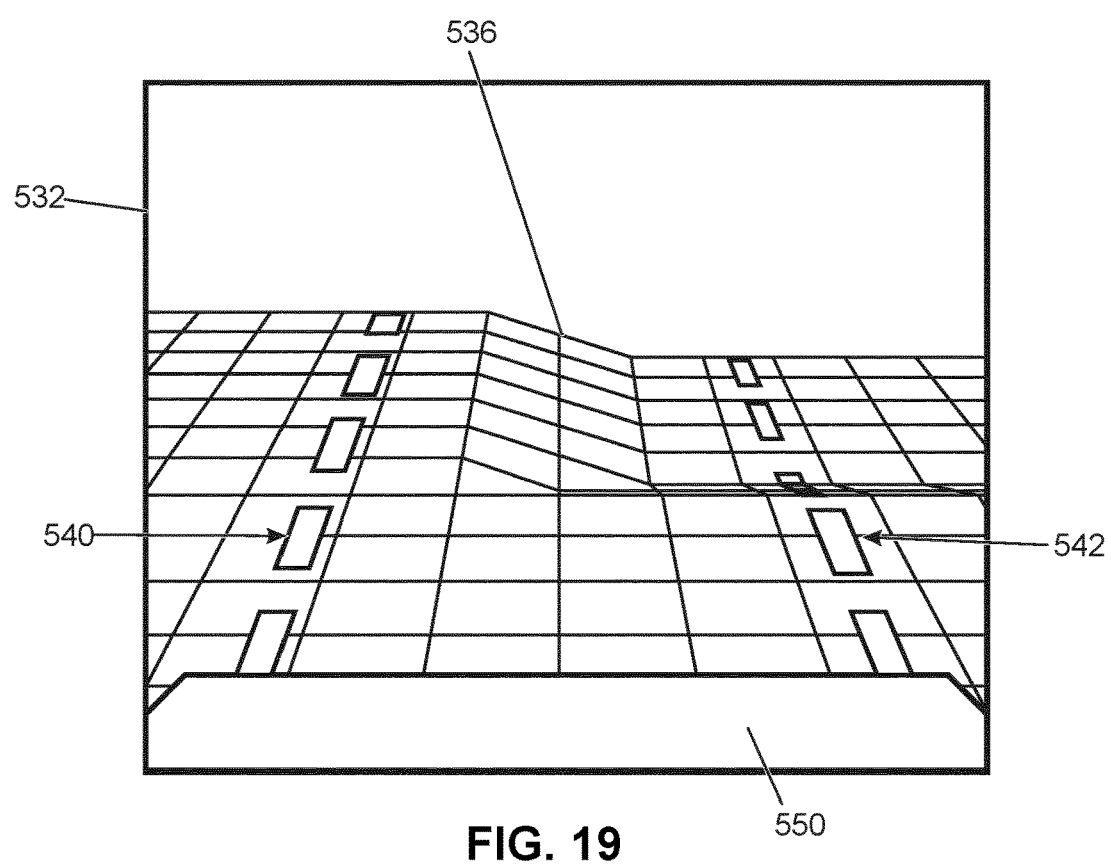
Figure 20:
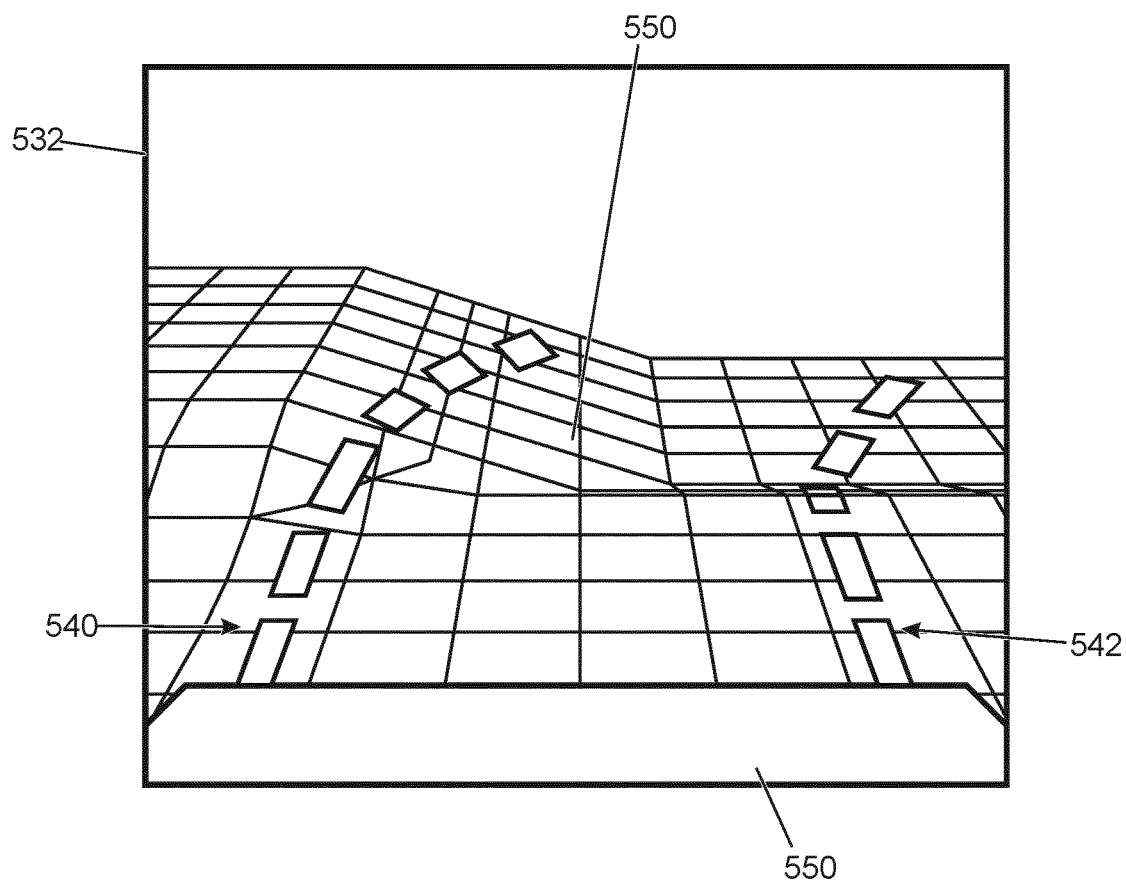

In FIG. 17, the topography of the surface 536 is such that there is an incline in gradient in the path of the vehicle 550. In FIG. 18, the topography of the surface 536 is such that there is an incline in gradient in the path of the right hand side of the vehicle 550. Accordingly, trajectory line 542 is shown to follow the incline in gradient of the surface 536. In FIG. 19, the topography of the surface 536 is such that there is a decline in gradient in the path of the right hand side of the vehicle 550. Accordingly, trajectory line 542 is shown to follow the decline in gradient of the surface 536. Each of FIGS. 17-19 show a trajectory of the vehicle 550 generally straight ahead of the vehicle 550. However, as will be appreciated and as shown in FIG. 20, the trajectory of the vehicle 550 may not be straight ahead of the vehicle 550, but may follow a path defined by a steering angle of the vehicle, as described herein, as well as in accordance with inclines and/or declines in the topography of the surface 536.

In the embodiments described herein, the control system 510 is configured to utilise raw sensor data from the sensor(s) 528 in order to determine a topography of the surface. However, it will be appreciated that the topography data may comprise a surface profile, point cloud or other formatted set of data points complied by a controller, processor or further control system external to the control system 510. In such embodiments, the control system 510 of the present invention is configured to use the formatted topography data to determine the topography of the surface 536.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a computer program comprising code for implementing a system or method as claimed, and a machine-readable storage storing such a program (e.g. a non-transitory computer readable medium). Still further, embodiments of the present invention may be conveyed electronically via any medium such as a communication signal carried over a wired or wireless connection and embodiments suitably encompass the same.

It will be appreciated that various changes and modifications can be made to the present invention without departing from the scope of the present application.

The invention claimed is:

1. A control system for providing assistance to an occupant of a vehicle, the control system comprising one or more controllers and configured to:
receive one or more vehicle parameters;
receive image data from an imaging device comprising captured images of an environment external to the vehicle;
determine a vehicle trajectory in dependence on the one or more vehicle parameters;
determine a composite image sequence comprising a sequence of image frames, each image frame comprising a captured image and a trajectory indicator indicative of the determined vehicle trajectory, the trajectory indicator providing a visual indication of a predicted path of a part of the vehicle; and
output a signal indicative of the composite image sequence to a display for displaying the composite image sequence to the occupant of the vehicle;
wherein the control system is configured to move the trajectory indicator from a first position in a first image frame of the composite image sequence, to a second position in a second image frame of the composite image sequence in dependence on a distance travelled by the vehicle between a time at which an image associated with the first image frame is captured and a time at which an image associated with the second image frame is captured such that the trajectory indicator appears substantially stationary with respect to a traversable surface within the composite image sequence; and wherein the control system is configured to move the trajectory indicator from the first position to the second position such that, to the occupant, the vehicle appears to move over the trajectory indicator as the vehicle traverses the surface along the determined vehicle trajectory.

2. The control system of claim 1, wherein the one or more controllers collectively comprise:

at least one electronic processor having one or more electrical inputs for receiving the one or more vehicle parameters and/or the image data; and at least one electronic memory device operatively coupled to the at least one electronic processor and having instructions stored therein;

wherein the at least one electronic processor is configured to access the at least one electronic memory device and execute the instructions stored therein so as to determine the composite image sequence.

3. The control system as claimed in claim 1, wherein the first position and the second position are separated within the composite image sequence by a distance directly proportional to the distance travelled by the vehicle between the time at which the image associated with the first image frame is captured and the time at which the image associated with the second image frame is captured.

4. The control system as claimed in claim 1, wherein the trajectory indicator comprises a plurality of indicator sections.

5. The control system as claimed in claim 4, further configured to move each of the indicator sections from respective first positions within the first image frame of the composite image sequence, to respective second positions within the second image frame of the composite image sequence in dependence on a distance travelled by the vehicle between the time at which an image associated with the first image frame is captured and the time at which an image associated with the second image frame is captured such each indicator section appears substantially stationary in the direction of travel of the vehicle within the composite image sequence with respect to the one or more image objects.

6. A system comprising the control system of claim 1, wherein the imaging device is configured to capture one or more images of an environment external to the vehicle.

7. A vehicle comprising the system of claim 6.

8. A vehicle comprising the control system of claim 1.

9. A method for providing assistance to an occupant of a vehicle, the method comprising:

receiving one or more vehicle parameters;

receiving image data comprising captured images of an environment external to the vehicle;

determining a vehicle trajectory in dependence on the one or more vehicle parameters;

determining a composite image sequence comprising a sequence of image frames, each image frame comprising a captured image and a trajectory indicator indicative of the determined vehicle trajectory, the trajectory indicator providing a visual indication of a predicted path of a part of the vehicle; and outputting a signal indicative of the composite image sequence to a display for displaying the composite image sequence to the occupant of the vehicle;

wherein the method comprises moving the trajectory indicator from a first position in a first image frame of the composite image sequence, to a second position in a second image frame of the composite image sequence in dependence on a distance travelled by the vehicle between a time at which an image associated with the first image frame is captured and a time at which an image associated with the second image frame is captured such that to the trajectory indicator appears substantially stationary with respect to a traversable surface within the composite image sequence; and wherein the method comprises moving the trajectory indicator from the first position to the second position such that, to the occupant, the vehicle appears to move over the trajectory indicator as the vehicle traverses the surface along the determined vehicle trajectory.

10. A non-transitory computer readable medium having instructions stored therein which, when executed by one or more electronic processors, cause the one or more electronic processors to perform the method according to claim 9.

11. One or more processors configured to perform the method of claim 9.

* * * * *